United States Patent
Ito

(10) Patent No.: US 11,475,775 B2
(45) Date of Patent: Oct. 18, 2022

(54) VEHICLE AND METHOD OF RECOGNIZING SURROUNDING VEHICLE

(71) Applicant: TOYOTA JIDOSHA KABUSHIKI KAISHA, Toyota (JP)

(72) Inventor: Hironori Ito, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/350,061

(22) Filed: Jun. 17, 2021

(65) Prior Publication Data
US 2022/0005357 A1  Jan. 6, 2022

(30) Foreign Application Priority Data
Jul. 6, 2020 (JP) .............................. JP2020-116505

(51) Int. Cl.
| | |
|---|---|
| G08G 1/00 | (2006.01) |
| G08G 1/01 | (2006.01) |
| G08G 1/0962 | (2006.01) |
| G08G 1/017 | (2006.01) |
| G06V 20/56 | (2022.01) |

(52) U.S. Cl.
CPC ............. *G08G 1/20* (2013.01); *G06V 20/56* (2022.01); *G08G 1/017* (2013.01); *G08G 1/0125* (2013.01); *G08G 1/0962* (2013.01)

(58) Field of Classification Search
CPC ........ G08G 1/20; G08G 1/0125; G08G 1/017; G08G 1/0962; G08G 1/04; G01S 17/42; G01S 17/18
See application file for complete search history.

(56) References Cited

U.S. PATENT DOCUMENTS

| | | | | |
|---|---|---|---|---|
| 10,302,754 | B1* | 5/2019 | Komori | .................. G06V 20/58 |
| 2009/0040095 | A1* | 2/2009 | Ogawa | .................... G01S 17/89 |
| | | | | 342/70 |
| 2018/0137339 | A1* | 5/2018 | Osato | ....................... G08G 1/16 |
| 2019/0162837 | A1* | 5/2019 | Komori | .................. G01S 13/931 |
| 2022/0005357 | A1* | 1/2022 | Ito | ......................... G08G 1/0125 |
| 2022/0179076 | A1* | 6/2022 | Noh | ........................ G01B 11/24 |

FOREIGN PATENT DOCUMENTS

| | | |
|---|---|---|
| JP | H06255399 A | 9/1994 |
| JP | 6397801 B | 9/2018 |
| JP | 2019096132 A | 6/2019 |

\* cited by examiner

*Primary Examiner* — Hoi C Lau
(74) *Attorney, Agent, or Firm* — Dickinson Wright, PLLC

(57) ABSTRACT

The vehicle includes a surrounding vehicle detector detecting reflected points of surrounding vehicles present around the vehicle by emitting electromagnetic waves to surroundings of the vehicle, and a processor configured to generate object marks by grouping the reflected points detected by the surrounding vehicle detector, and edit the generated object marks. The processor is configured to extract two object marks from the generated object marks, identify an ideal shape for when the two object marks are merged based on surfaces defined by the two object marks and able to be seen from the vehicle, and merge the two object marks into the ideal shape if predetermined merger conditions are satisfied.

11 Claims, 20 Drawing Sheets

FIG. 5
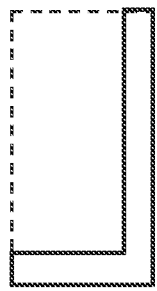
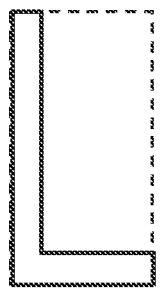
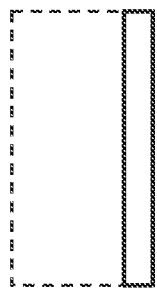
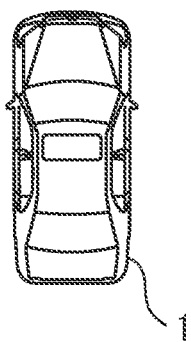
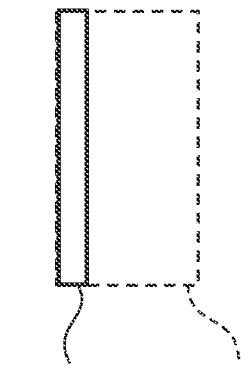
OBJECT MARK   SURROUNDING VEHICLE
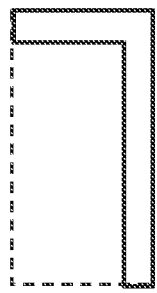
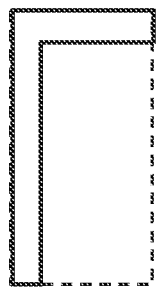

FIG. 7

| FRONT SURFACE | ◯ | × | × | × | × | ◯ | ◯ | × | ◯ |
|---|---|---|---|---|---|---|---|---|---|
| BACK SURFACE | × | ◯ | × | × | × | × | × | ◯ | ◯ |
| RIGHT SIDE SURFACE | × | × | ◯ | × | ◯ | ◯ | × | ◯ | × |
| LEFT SIDE SURFACE | × | × | × | ◯ | × | × | ◯ | × | ◯ |
| IDEAL SHAPE | — | — | — | — | ⌐ | ⌐ | ⌐ | ⌐ | ⌐ |

FIG. 17
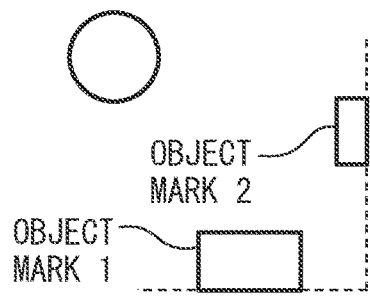
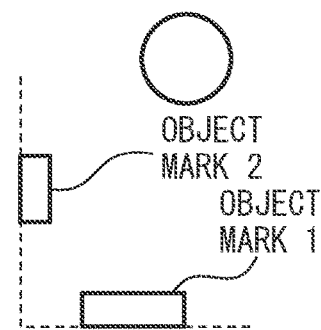
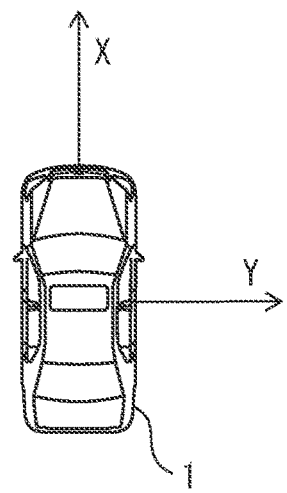
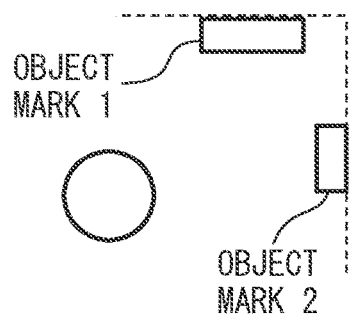
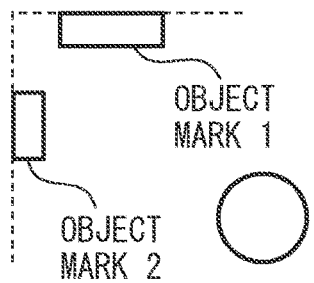

FIG. 18
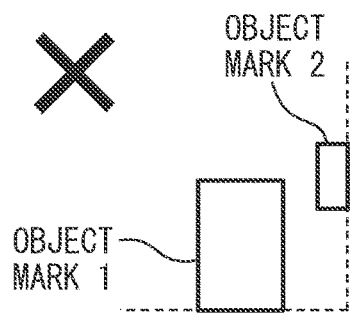
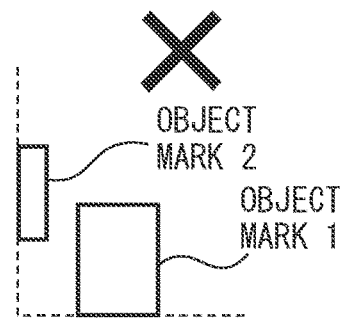
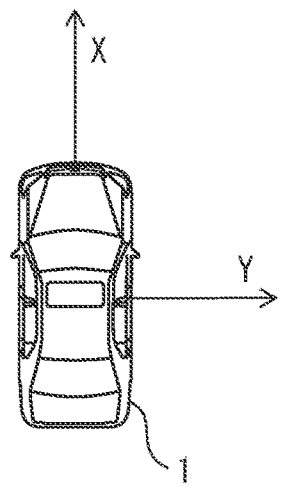
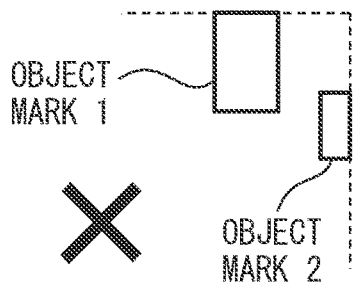
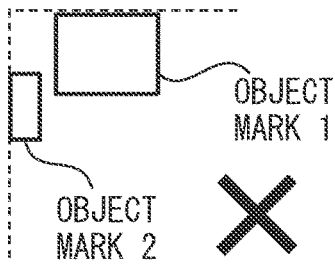

FIG. 19
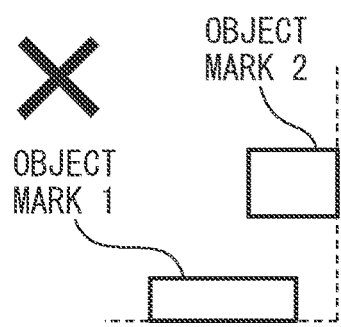
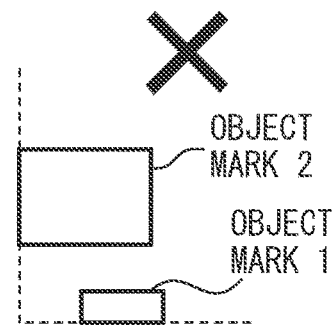
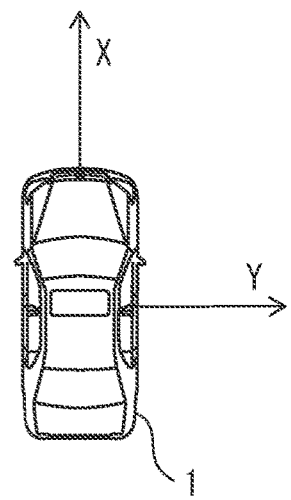
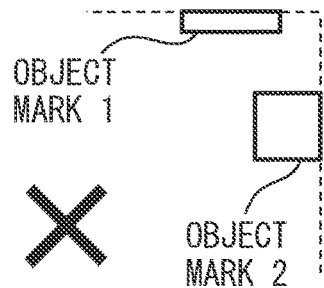
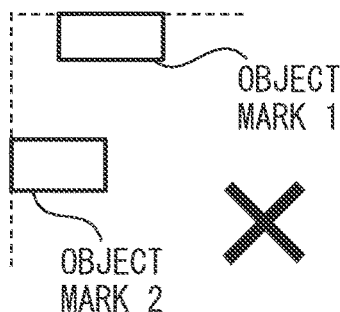

FIG. 20
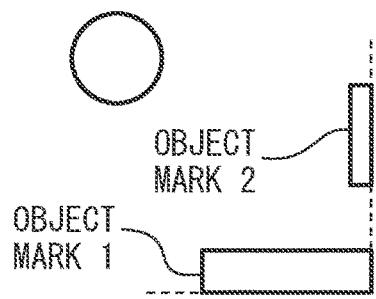
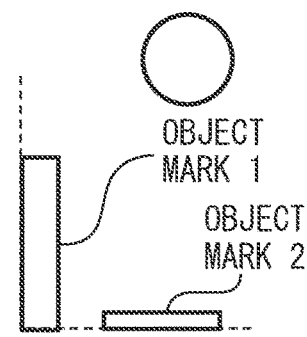
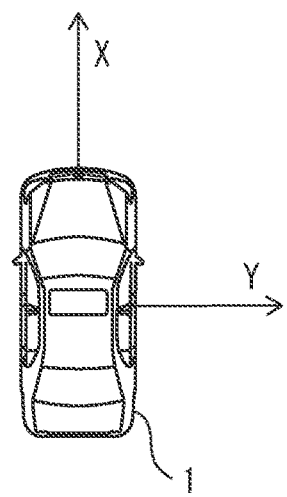
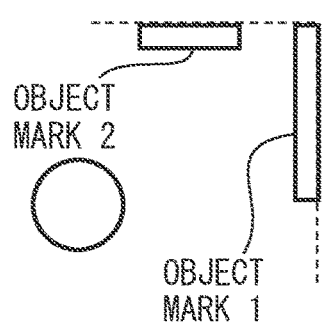
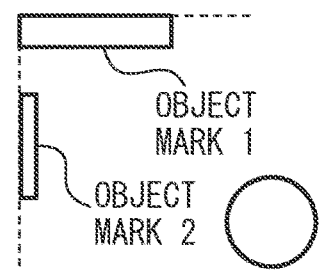

VEHICLE AND METHOD OF RECOGNIZING SURROUNDING VEHICLE

FIELD

The present disclosure relates to a vehicle and a method of recognizing a surrounding vehicle.

BACKGROUND

In the past, it has been known to recognize a surrounding vehicle around a vehicle based on an output of a surrounding vehicle detection device mounted in the vehicle (for example, PTL 1).

CITATIONS LIST

Patent Literature

[PTL 1] Japanese Unexamined Patent Publication No. 6-255399

SUMMARY

Technical Problem

The surrounding vehicle detection device emits electromagnetic waves to the surroundings of a vehicle to detect reflected points of a surrounding vehicle present around a host vehicle. However, if there is a part with a low reflection intensity (mirror surface, black part, etc.) present in the surrounding vehicle, the reflected points of this part will be missed. As a result, sometimes two object marks will be generated for a single surrounding vehicle and a single surrounding vehicle will be recognized as two surrounding vehicles.

Therefore, in consideration of the above problem, an object of the present disclosure is to raise the precision of recognition of a surrounding vehicle around a vehicle.

Solution to Problem

The summary of the present disclosure is as follows.

(1) A vehicle comprising: a surrounding vehicle detector detecting reflected points of surrounding vehicles present around the vehicle by emitting electromagnetic waves to surroundings of the vehicle, and a processor configured to generate object marks by grouping the reflected points detected by the surrounding vehicle detector, and edit the generated object marks, wherein the processor is configured to extract two object marks from the generated object marks, identify an ideal shape for when the two object marks are merged based on surfaces defined by the two object marks and able to be seen from the vehicle, and merge the two object marks into the ideal shape if predetermined merger conditions are satisfied.

(2) The vehicle described in above (1), wherein the merger conditions differ according to a type of the ideal shape identified by the processor.

(3) The vehicle described in above (1) or (2), wherein if the ideal shape identified by the processor is an I-shape, the merger conditions include the nearby surfaces of the two object marks being aligned.

(4) The vehicle described in any one of above (1) to (3), wherein if the ideal shape identified by the processor is an I-shape, the merger conditions include a length in a direction vertical to a nearby surface of an object mark far from the vehicle among the two object marks being equal to or less than a predetermined value.

(5) The vehicle described in any one of above (1) to (4), wherein if the ideal shape identified by the processor is an I-shape, the merger conditions include the two object marks not overlapping.

(6) The vehicle described in any one of above (1) to (5), wherein if the ideal shape identified by the processor is an L-shape, the merger conditions include nearby surfaces of the two object marks not being aligned.

(7) The vehicle described in any one of above (1) to (6), wherein if the ideal shape identified by the processor is an L-shape, the merger conditions include one object mark among the two object marks not being positioned behind the other object mark among the two object marks when seen from the vehicle.

(8) The vehicle described in any one of above (1) to (7), further comprising a display displaying object marks edited by the processor as vehicle icons.

(9) The vehicle described in above (8), wherein the merger conditions include a difference between a size when the two object marks are merged to the ideal shape and a size of the vehicle icon being equal to or less than a predetermined value.

(10) The vehicle described in any one of above (8) or (9), wherein the processor is further configured to control autonomous running of the vehicle, the processor is configured to create a first group of object marks to be displayed on the display by editing the generated object marks based on a first standard, and create a second group of object marks used for control of the autonomous running by editing the generated object marks based on a second standard, and in the first standard, the two object marks are merged into the ideal shape if the merger conditions are satisfied, and in the second standard, the two object marks are not merged into the ideal shape.

(11) A method of recognition of a surrounding vehicle comprising: detecting reflected points of surrounding vehicles present around the vehicle by emitting electromagnetic waves to surroundings of the vehicle; generating object marks by grouping the reflected points; extracting two object marks from the object marks; and identifying an ideal shape when the two object marks are merged based on surfaces defined by the two object marks and able to be seen from the vehicle and merging the two object marks into the ideal shape if predetermined merger conditions are satisfied.

Advantageous Effects of Invention

According to the present disclosure, it is possible to raise the precision of recognition of a surrounding vehicle around a vehicle.

BRIEF DESCRIPTION OF DRAWINGS

FIG. 5 is a view showing examples of object marks generated from reflected points of surrounding vehicles around a vehicle.

FIG. 7 is a view showing a correspondence relationship between combinations of surfaces able to be seen from a vehicle and ideal shapes when two object marks are merged.

FIG. 17 is a view showing examples of two object marks in cases where merger conditions for an L-shape are satisfied.

FIG. 18 is a view showing examples of two object marks in cases where merger conditions for an L-shape are not satisfied.

FIG. 19 is a view showing examples of two object marks in cases where merger conditions for an L-shape are not satisfied.

FIG. 20 is a view showing examples of two object marks in cases where merger conditions for an L-shape are satisfied.

DESCRIPTION OF EMBODIMENTS

Figure 1:
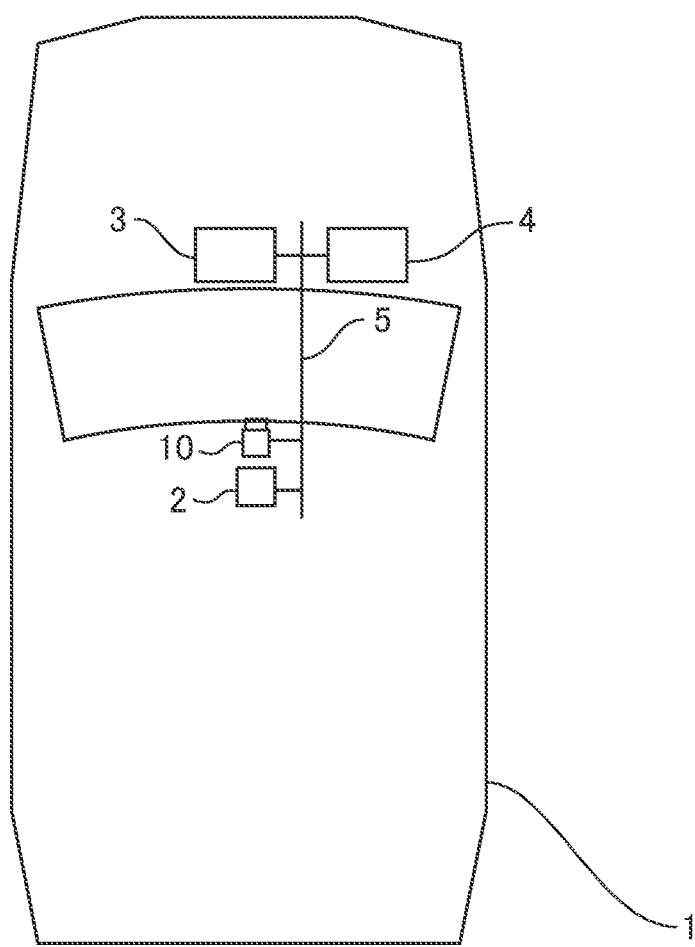
FIG. 1 is a view schematically showing the configuration of a vehicle according to one embodiment of the present disclosure.

Below, referring to the drawings, embodiments of the present disclosure will be explained in detail. Note that, in the following explanation, similar component elements are assigned the same reference notations.

First Embodiment

First, referring to FIG. 1 to FIG. 10, a first embodiment of the present disclosure will be explained.

<Configuration of Vehicle>

FIG. 1 is a view schematically showing the configuration of a vehicle 1 according to the first embodiment of the present disclosure. The vehicle 1 is capable of autonomous running in which a part or all of the acceleration, braking, and steering are automatically performed. That is, the vehicle 1 is a so-called "self-driving vehicle". The acceleration, braking, and steering may be referred to as "acceleration, deceleration, and turning" or "driving, braking, and steering".

As shown in FIG. 1, the vehicle 1 is provided with a camera 10, a surrounding vehicle detection device 2, a display device 3, and an electronic control unit (ECU) 4. The camera 10, the surrounding vehicle detection device 2, the display device 3, and the ECU 4 are connected to be able to communicate with each other through an internal vehicle network 5 based on the CAN (Controller Area Network) or other standard.

The camera 10 captures the area in front of the vehicle 1 and generates an image of a predetermined range. The camera 10 is provided inside of the vehicle 1, for example, at a back surface of a room mirror in a passenger compartment.

The surrounding vehicle detection device 2 emits electromagnetic waves (laser beams, milliwaves, etc.,) to the surroundings of the vehicle 1 (host vehicle) to thereby detect reflected points of surrounding vehicles present around the vehicle 1. The surrounding vehicle detection device 2 is, for example, a distance measurement sensor able to detect the presence of any object around the vehicle 1 and the distance from the vehicle 1 to the object.

In the present embodiment, the surrounding vehicle detection device 2 is comprised of a plurality of lidars (laser imaging detection and ranging (LIDAR)) placed at different positions of the vehicle 1. Lidars emit laser beams to the surroundings of the vehicle 1 and receives reflected beams of the laser beams. By doing this, Lidars can detect the presence of any object around the vehicle 1 and the distance from the vehicle 1 to the object.

Note that, the surrounding vehicle detection device 2 may be comprised of a single lidar placed on the roof of the vehicle 1 etc. Further, the surrounding vehicle detection device 2 may be comprised of at least one milliwave radar. A milliwave radar emits milliwaves to the surroundings of the vehicle 1 and receives reflected waves of the milliwaves. By doing this, a milliwave radar can detect the presence of any object around the vehicle 1 and the distance from the vehicle 1 to the object. Further, the surrounding vehicle detection device 2 may be comprised of at least one lidar and at least one milliwave radar.

The display device 3 displays various types of information to a driver of the vehicle 1. The display device 3 is provided inside of the vehicle so that it is visible to the driver of the vehicle 1. The display device 3 is, for example, a human machine interface (HMI) comprised of at least one of a touch screen, a heads up display, a digital instrument panel, etc. The display device 3 is, for example, provided with a display part for displaying image information etc., speakers for generating sound, operating buttons for the driver to perform entry operations, a microphone receiving voice information from the driver, etc.

Figure 2:
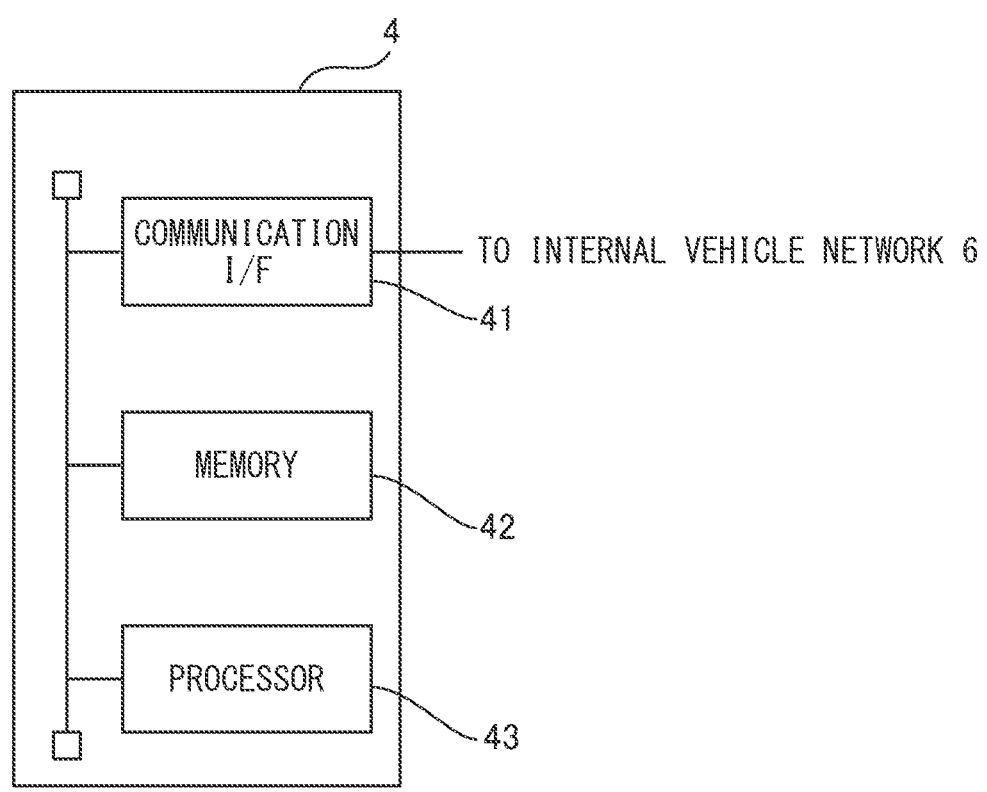
FIG. 2 is a view schematically showing the configuration of an ECU.

The ECU 4 is provided at vehicle 1 and performs various types of control routines of the vehicle 1. FIG. 2 is a view schematically showing the configuration of the ECU 4. As shown in FIG. 2, the ECU 4 is provided with a communication interface 41, a memory 42, and a processor 43. The communication interface 41 and the memory 42 are connected to the processor 43 through signal lines.

The communication interface 41 has an interface circuit for connecting the ECU 4 to the internal vehicle network. That is, the communication interface 41 is connected through the internal vehicle network to the surrounding vehicle detection device 2 and the display device 3. The surrounding vehicle detection device 2 sends its output through the communication interface 41 to the processor 43. Further, the processor 43 sends commands relating to display of surrounding vehicles to the display device 3.

The memory 42, for example, has a volatile semiconductor memory and a nonvolatile semiconductor memory. The memory 42 stores programs, data, etc., to be used when various types of processing are performed by the processor 43.

The processor 43 has one or more CPUs (central processing units) and their peripheral circuits. Note that, the processor 43 may further have processing circuits such as arithmetic logic units or numerical calculation units.

Figure 3:
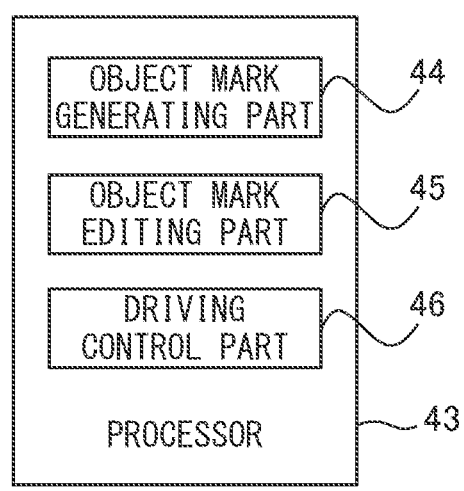
FIG. 3 is a functional block diagram of a processor of an ECU.

FIG. 3 is a functional block diagram of the processor 43 of the ECU 4. In the present embodiment, the processor 43 has an object mark generating part 44, an object mark editing part 45, and a driving control part 46. The object mark generating part 44, the object mark editing part 45, and the driving control part 46 are functional modules respectively realized by programs stored in the memory 42 being run by the processor 43. Note that, the object mark generating part 44, the object mark editing part 45, and the driving control part 46 may respectively be dedicated processing circuits provided in the processor 43.

Figure 4:
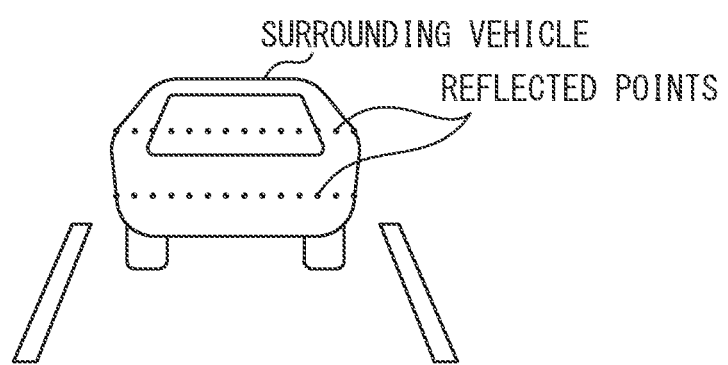
FIG. 4 is a view schematically showing reflected points of a surrounding vehicle detected by a surrounding vehicle detection device.

FIG. 4 is a view schematically showing reflected points of a surrounding vehicle detected by the surrounding vehicle detection device 2. In the example of FIG. 4, the reflected points of a surrounding vehicle running in front of the vehicle 1 are detected. The information of the reflected points detected by the surrounding vehicle detection device 2 (distance, bearing angle, intensity, etc.,) is sent to the object mark generating part 44. The object mark generating part 44 groups the reflected points detected by the surrounding vehicle detection device 2 to thereby generate an object mark. Specifically, the object mark generating part 44 groups consecutive reflected points as a group of reflected points and generates an object mark surrounding the group of reflected points.

FIG. 5 is a view showing examples of object marks generated from reflected points of surrounding vehicles around the vehicle 1. In FIG. 5, the positions of surrounding vehicles around the vehicle 1 are shown by the broken lines, and object marks corresponding to the surrounding vehicles are shown by the solid lines. As shown in FIG. 5, the shapes of the object marks differ according to the positions of the surrounding vehicles with respect to the vehicle 1.

When a back surface of a surrounding vehicle positioned in front of the vehicle 1 is detected or when a front surface of a surrounding vehicle positioned in back of the vehicle 1 is detected, the shape of the object mark becomes a traverse direction I-shape. When a side surface (right side surface or left side surface) of a surrounding vehicle positioned at a side of the vehicle 1 (right side or left side) is detected, the shape of the object mark becomes a longitudinal direction I-shape.

When a back surface and a left side surface of a surrounding vehicle positioned diagonally to the right in front of the vehicle 1 are detected, the shape of the object mark becomes a forward direction L-shape. When a back surface and a right side surface of a surrounding vehicle positioned diagonally to the left in front of the vehicle 1 are detected, the shape of the object mark becomes an L-shape inverted left to right. When a front surface and a left side surface of a surrounding vehicle positioned diagonally to the right in back of the vehicle 1 are detected, the shape of the object mark becomes an L-shape inverted top to bottom. When a front surface and a right side surface of a surrounding vehicle positioned diagonally to the left in back of the vehicle 1 are detected, the shape of the object mark becomes an L-shape inverted top to bottom and left to right.

In these cases, one object mark is generated for one surrounding vehicle and the surrounding vehicles are accurately recognized. On the other hand, if there is a part with a low intensity of reflection (mirror surface, black part, etc.) present in a surrounding vehicle, the reflected points of that part will be missed. As a result, two object marks will sometimes be generated for one surrounding vehicle and one surrounding vehicle will sometimes be recognized as two surrounding vehicles.

For this reason, in the present embodiment, the object mark editing part 45 edits the object marks generated by the object mark generating part 44 so as to correct the correspondence relationship between the object marks and the surrounding vehicles. The object mark editing part 45 extracts two object marks from the object marks generated by the object mark generating part 44 and judges whether to merge these two object marks.

As explained above, the shape of an object mark corresponding to a surrounding vehicle changes in accordance with the position of the surrounding vehicle with respect to the vehicle 1. For this reason, the object mark editing part 45 identifies an ideal shape when two object marks are merged based on surfaces defined by the two object marks and able to be seen from the vehicle 1 and, when predetermined merger conditions are satisfied, merges the two object marks to the ideal shape. Due to this, it is possible to merge two separated object marks into the correct shape and in turn possible to raise the precision of recognition of the surrounding vehicles.

Figure 6:
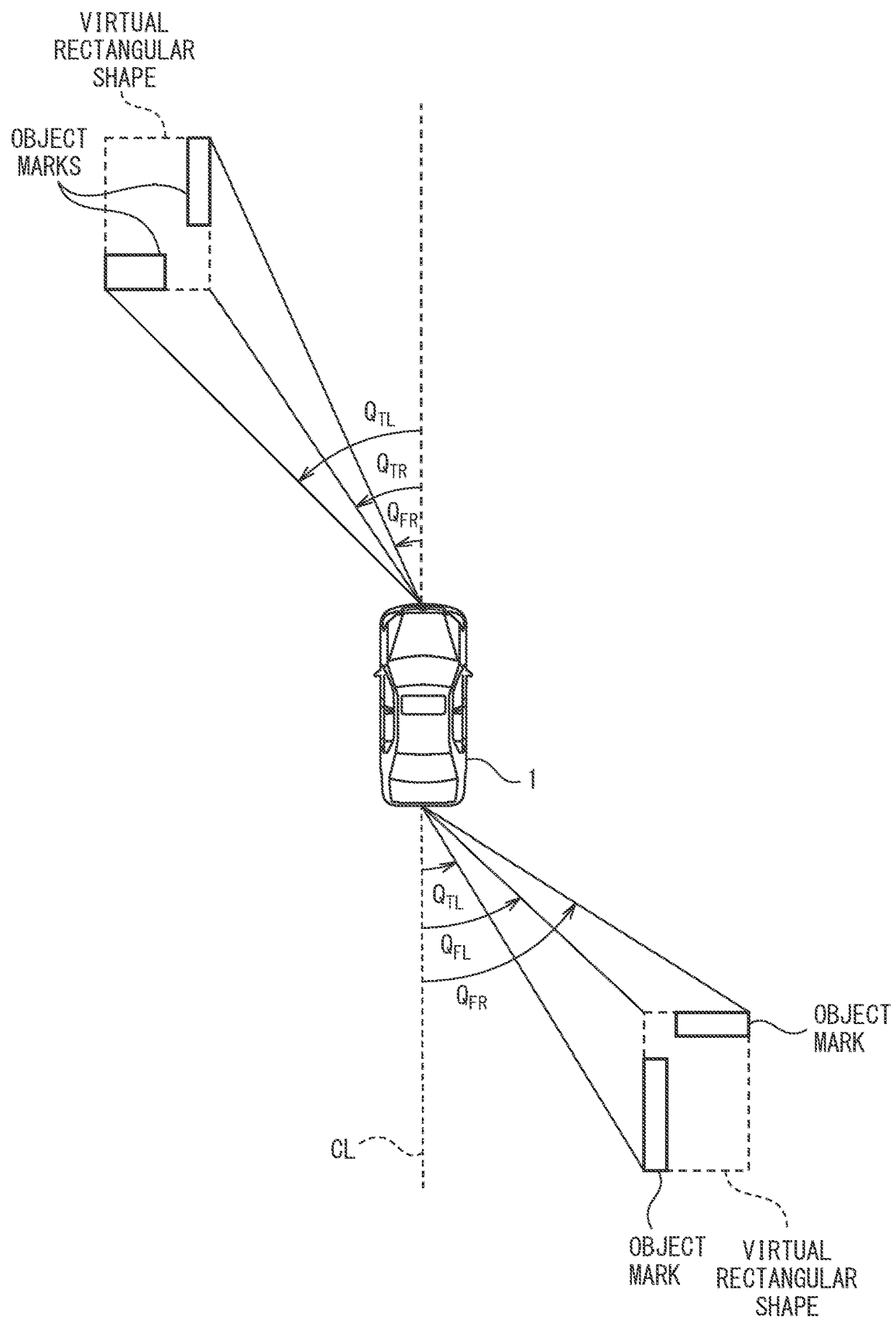
FIG. 6 is a view for explaining one example of a method for identifying surfaces defined by two object marks and able to be seen from a vehicle.

FIG. 6 is a view for explaining one example of the method for identifying surfaces defined by two object marks and able to be seen from the vehicle 1. In the example of FIG. 6, two object marks generated with respect to a surrounding vehicle positioned diagonally to the right in back of the vehicle 1 and two object marks generated with respect to a surrounding vehicle positioned diagonally to the left in front of the vehicle 1 are shown.

First, the object mark editing part 45 creates a virtual rectangular shape surrounding the two object marks and identifies the positions of the three nearby corners close to the vehicle 1 among the four corners of the virtual rectangular shape. At this time, the surfaces between adjoining nearby corners become candidates for the surfaces able to be seen from the vehicle 1. At the two object marks diagonally to the right in back of the vehicle 1, the front right, front left, and back left corners correspond to the nearby corners. The front surface between the front right corner and the front left corner and the left side surface between the front left corner and the back left corner become candidates for surfaces able to be seen from the vehicle 1. On the other hand, at the two object marks diagonally to the left in front of the vehicle 1, the front right, back right, and back left corners correspond to the nearby corners. The back surface between the back right corner and the back left corner and the right side surface between the front right corner and the back right corner become candidates for surfaces able to be seen from the vehicle 1.

Next, the object mark editing part 45 judges whether the surfaces between adjoining nearby corners can be seen from the vehicle 1. For example, the object mark editing part 45 judges that a surface between the adjoining nearby corners can be seen from the vehicle 1 when the difference of the angles of the two nearby corners with respect to the vehicle 1 is equal to or greater than a predetermined value. On the other hand, the object mark editing part 45 judges that a surface between the adjoining nearby corners cannot be seen from the vehicle 1 when the difference of the angles of the two nearby corners with respect to the vehicle 1 is less than the predetermined value.

The angle of a nearby corner with respect to the vehicle 1 is, for example, defined as an angle formed by a line connecting a predetermined position of the vehicle 1 and the nearby corner, and a vehicle width centerline CL of the vehicle 1. The predetermined position of the vehicle 1 is, for example, set as a mounting position of the surrounding vehicle detection device 2 detecting the two object marks. Note that, the predetermined position of the vehicle 1 may be the center or center of gravity of the vehicle 1.

As shown in the following formula (1), when the difference between the angle $\theta_{FR}$ of the front right nearby corner with respect to the vehicle 1 and the angle $\theta_{FL}$ of the front left nearby corner with respect to the vehicle 1 is equal to or greater than a predetermined value $\alpha_1$, it is judged that the front surface can be seen.

$$|\theta_{FR}-\theta_{FL}|\geq\alpha_1 \quad (1)$$

As shown in the following formula (2), when the difference between the angle $\theta_{FL}$ of the front left nearby corner with respect to the vehicle 1 and the angle $\theta_{TL}$ of the back left nearby corner with respect to the vehicle 1 is equal to or greater than a predetermined value $\alpha_2$, it is judged that the left side surface can be seen. The predetermined value $\alpha_2$ may be the same as or may be different from the predetermined value $\alpha_1$.

$$|\theta_{FL}-\theta_{TL}|\geq\alpha_2 \quad (2)$$

As shown in the following formula (3), when the difference between the angle $\theta_{TR}$ of the back right nearby corner with respect to the vehicle 1 and the angle $\theta_{TL}$ of the back left nearby corner with respect to the vehicle 1 is equal to or greater than a predetermined value $\alpha_3$, it is judged that the back surface can be seen. The predetermined value $\alpha_3$ may be the same as or may be different from the predetermined value $\alpha_1$.

$$|\theta_{TR}-\theta_{TL}|\geq\alpha_3 \quad (3)$$

As shown in the following formula (4), when the difference between the angle $\theta_{FR}$ of the front right nearby corner with respect to the vehicle 1 and the angle $\theta_{TR}$ of the back right nearby corner with respect to the vehicle 1 is equal to or greater than a predetermined value $\alpha_4$, it is judged that the right side surface can be seen. The predetermined value $\alpha_4$ may be the same as or may be different from the predetermined value $\alpha_1$.

$$|\theta_{FR}-\theta_{TR}|\geq\alpha_4 \quad (4)$$

Note that, the method of identifying surfaces defined by two object marks and able to be seen from the vehicle 1 is not limited to the above-mentioned method. For example, the object mark editing part 45 may identify surfaces defined by two object marks and able to be seen from the vehicle 1 based on the coordinate etc., of the center point of the virtual rectangular shape in a reference coordinate system having the center of the vehicle 1 as the origin.

FIG. 7 is a view showing the correspondence relationship between combinations of surfaces able to be seen from vehicle 1 and the ideal shapes when two object marks are merged. The circle mark in the figure shows the target surface can be seen, while the x mark in the figure show the target surface cannot be seen.

When only the front surface or the back surface is a surface which can be seen, the ideal shape is identified as a traverse direction I-shape, while when only the right side surface or the left side surface is a surface which can be seen, the ideal shape is identified as a longitudinal direction I-shape. When the front surface and the right side surface are surfaces which can be seen, the ideal shape is identified as an L-shape inverted top to bottom and left to right, while when the front surface and the left side surface are surfaces which can be seen, the ideal shape is identified as an L-shape inverted top to bottom. When the back surface and the right side surface are surfaces which can be seen, the ideal shape is identified as an L-shape inverted left to right, while when the back surface and the left side surface are surfaces which can be seen, the ideal shape is identified as a forward direction L-shape.

<Object Mark Editing Processing>

Figure 8:
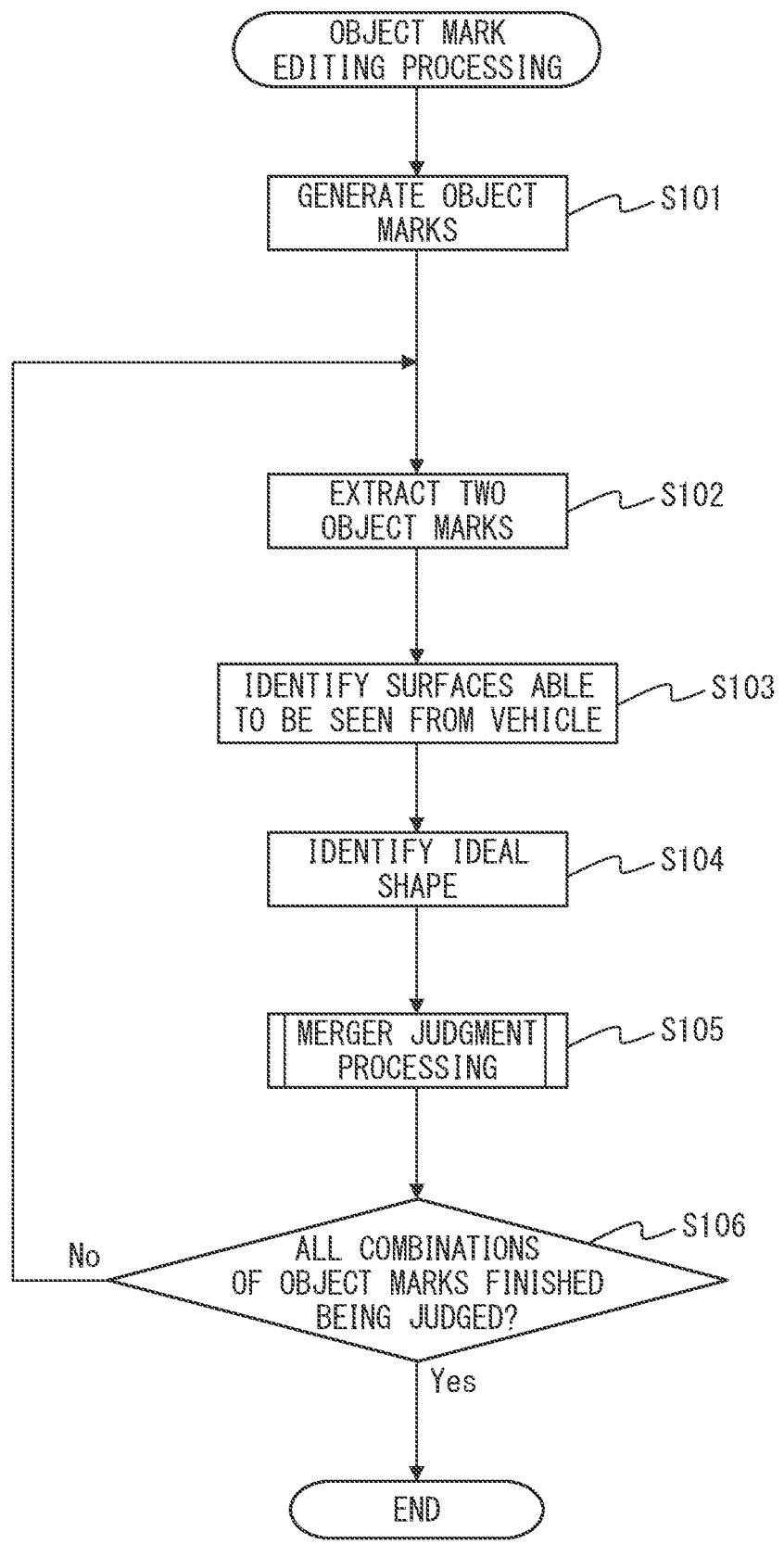
FIG. 8 is a flow chart showing a control routine of an object mark editing processing in a first embodiment of the present disclosure.

Below, referring to the flow charts of FIG. 8 and FIG. 9, the control for editing the object marks and recognizing the surrounding vehicles will be explained in detail. FIG. 8 is a flow chart showing the control routine of the object mark editing processing in the first embodiment of the present disclosure. The present control routine is repeatedly performed at predetermined execution intervals by the ECU 4. The predetermined execution intervals are, for example, intervals at which the output of the surrounding vehicle detection device 2 is sent to the ECU 4.

First, at step S101, the object mark generating part 44 generates object marks by grouping reflected points of the surrounding vehicles detected by the surrounding vehicle detection device 2.

Next, at step S102, the object mark editing part 45 extracts two object marks from the object marks generated by the object mark generating part 44.

Next, at step S103, the object mark editing part 45 identifies the surfaces defined by the two object marks and able to be seen from the vehicle 1.

Next, at step S104, the object mark editing part 45 identifies the ideal shape when the two object marks are merged in accordance with the table shown in FIG. 7 based on the surfaces identified at step S103.

Figure 9:
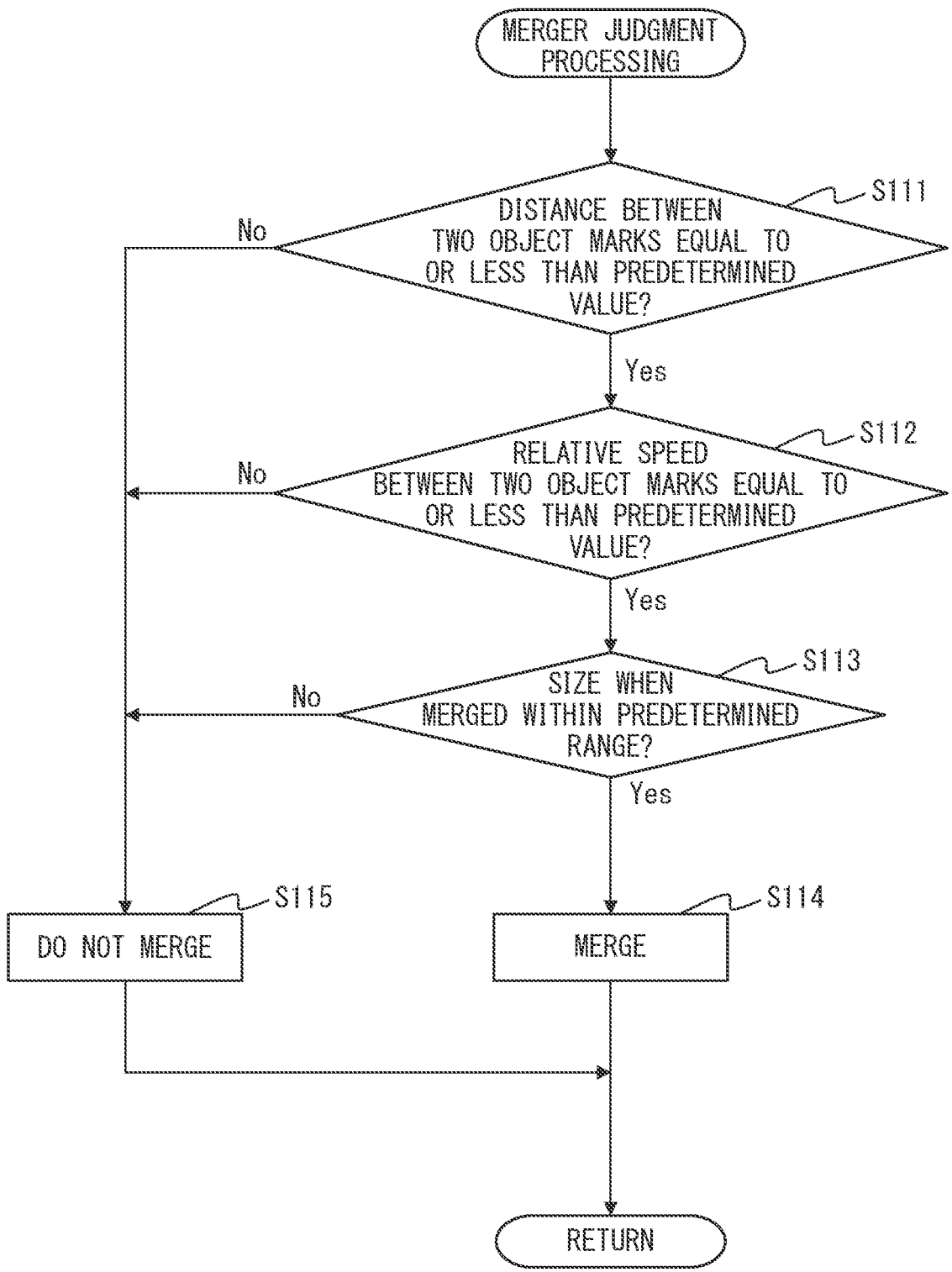
FIG. 9 is a flow chart showing a control routine of a merger judgment processing in the first embodiment of the present disclosure.

Next, at step S105, the object mark editing part 45 performs the merger judgment processing shown in FIG. 9 to judge whether to merge the two object marks.

In the merger judgment processing, first, at step S111, the object mark editing part 45 judges whether the distance between the two object marks is equal to or less than a predetermined value. That is, the merger conditions include the distance between the two object marks being equal to or less than a predetermined value. Note that, the predetermined value may be changed in accordance with the speeds of the two object marks (for example, the average speeds). The speeds of the two object marks are detected by the surrounding vehicle detection device 2. If at step S111 it is judged that the distance between the two object marks is equal to or less than the predetermined value, the present control routine proceeds to step S112.

At step S112, the object mark editing part 45 judges whether the relative speed between the two object marks is equal to or less than a predetermined value. That is, the merger conditions include the relative speed between the two object marks being equal to or less than a predetermined value. If at step S112 it is judged that the relative speed between the two object marks is equal to or less than the predetermined value, the present control routine proceeds to step S113.

At step S113, the object mark editing part 45 judges whether the size when the two object marks are merged (length in vehicle width direction and length in front-back direction) is within a predetermined range. That is, the merger conditions include that the size when the two object marks are merged be within a predetermined range. The predetermined range is, for example, set to a range between an upper limit of size of a general vehicle and zero. Note that, the predetermined range may be set to a range between an upper limit value and a lower limit value of the size of a general vehicle. In this case, if the ideal shape is a traverse direction I-shape, only the length in the vehicle width direction is judged as the size when the two object marks are merged to the ideal shape, while if the ideal shape is a longitudinal direction I-shape, only the length in the front-back direction is judged as the size when the two object marks are merged to the ideal shape.

If at step S113 it is judged that the size when the two object marks are merged is within the predetermined range, the present control routine proceeds to step S114. At step S114, since all of the merger conditions are satisfied, the object mark editing part 45 merges the two object marks to the ideal shape. That is, the two object marks are recognized as a single surrounding vehicle. On the other hand, if the judgment of step S111, S112 or S113 is negative, the present control routine proceeds to step S115. At step S115, the object mark editing part 45 does not merge the two object marks. That is, the two object marks are recognized as two surrounding vehicles. After step S114 or step S115, the present control routine proceeds to step S106 of FIG. 8.

At step S106, the object mark editing part 45 judges whether all of the combinations of the object marks generated by the object mark generating part 44 have finished being judged. If it is judged that they have not finished being judged, step S102 to step S105 are again performed. On the other hand, if it is judged that they have finished being judged, the present control routine ends.

Figure 10:
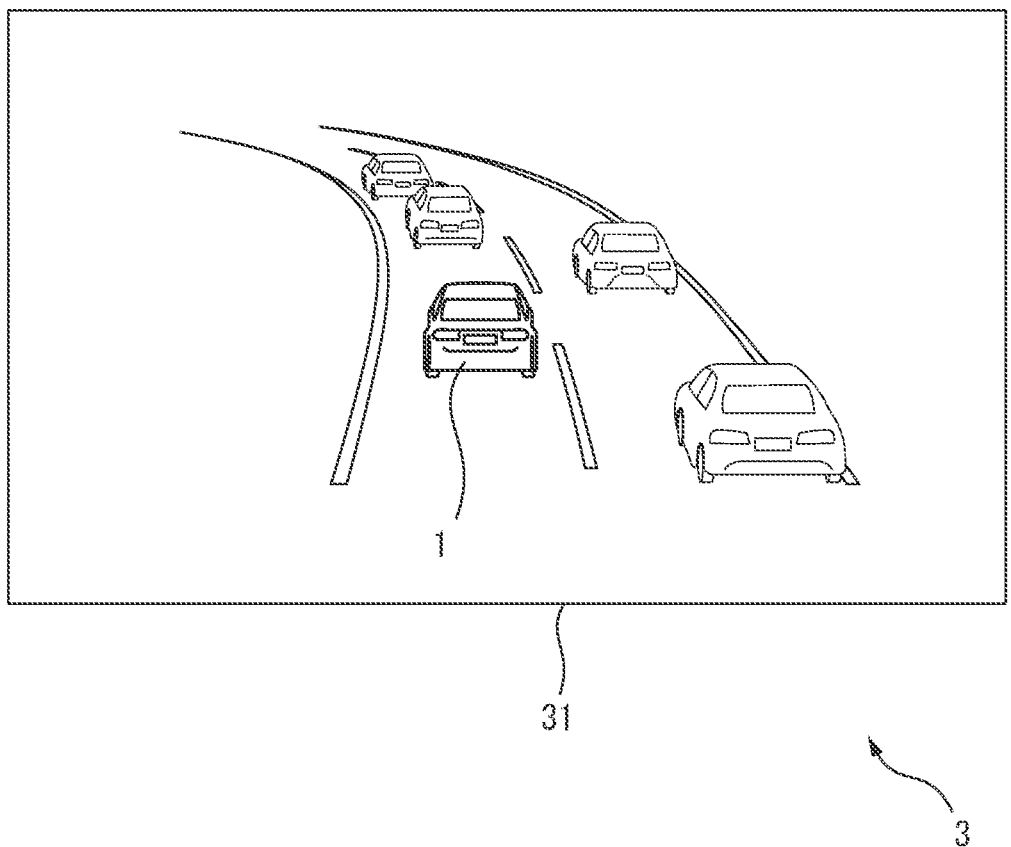
FIG. 10 is a view showing one example of an image displayed on a display part of a display device.

The display device 3 displays object marks edited by the object mark editing part 45 as vehicle icons. The sizes and shapes of the vehicle icons are determined in advance. FIG. 10 is a view showing one example of an image displayed on the display part 31 of the display device 3. As shown in FIG. 10, the display device 3 displays surrounding vehicles around the vehicle 1 together with the vehicle 1. Therefore, the surrounding vehicle detection device 2, the display device 3, the object mark generating part 44, and the object mark editing part 45 function as a surrounding vehicle display system.

Further, the driving control part 46 controls the autonomous running of the vehicle 1 based on the object marks edited by the object mark editing part 45. For example, the driving control part 46 uses actuators provided at the vehicle 1 to control the autonomous running of the vehicle 1 so as to avoid collision with object marks edited by the object mark editing part 45.

Note that, at step 113 of FIG. 9, the object mark editing part 45 may judge whether the difference between the size when two object marks are merged into the ideal shape (length in the vehicle width direction and length in the front-back direction) and the size of the vehicle icon (length in the vehicle width direction and length in the front-back direction) is equal to or less than a predetermined value. Due to this, when two object marks are merged, it is possible to keep the size of an actual surrounding vehicle and the size of a vehicle icon displayed at the display device 3 from greatly differing and possible to reduce any odd feeling of the driver. Note that, if the ideal shape is a traverse direction I-shape, only the length in the vehicle width direction is judged as the size when two object marks are merged into the ideal shape while if the ideal shape is a longitudinal direction I-shape, only the length in the front-back direction is judged as the size when two object marks are merged into the ideal shape.

Further, as the merger conditions, one or any combination of step S111 to step S113 may be used.

Second Embodiment

The vehicle according to the second embodiment is basically the same in configuration and control as the vehicle according to the first embodiment except for the points explained below. For this reason, below, the second embodiment of the present disclosure will be explained centered on parts different from the first embodiment.

As explained above, if the predetermined merger conditions are satisfied, the object mark editing part 45 merges the two object marks to the ideal shape. In this connection, in the second embodiment, the merger conditions differ according to the type of the ideal shape identified by the object mark editing part 45. Due to this, since conditions unique to the respective ideal shapes are considered in judging whether to merge objects, the precision of recognition of surrounding vehicles can be raised. In the second embodiment, as the ideal shapes, two types, that is, an I-shape and L-shape, are used.

Figure 11:
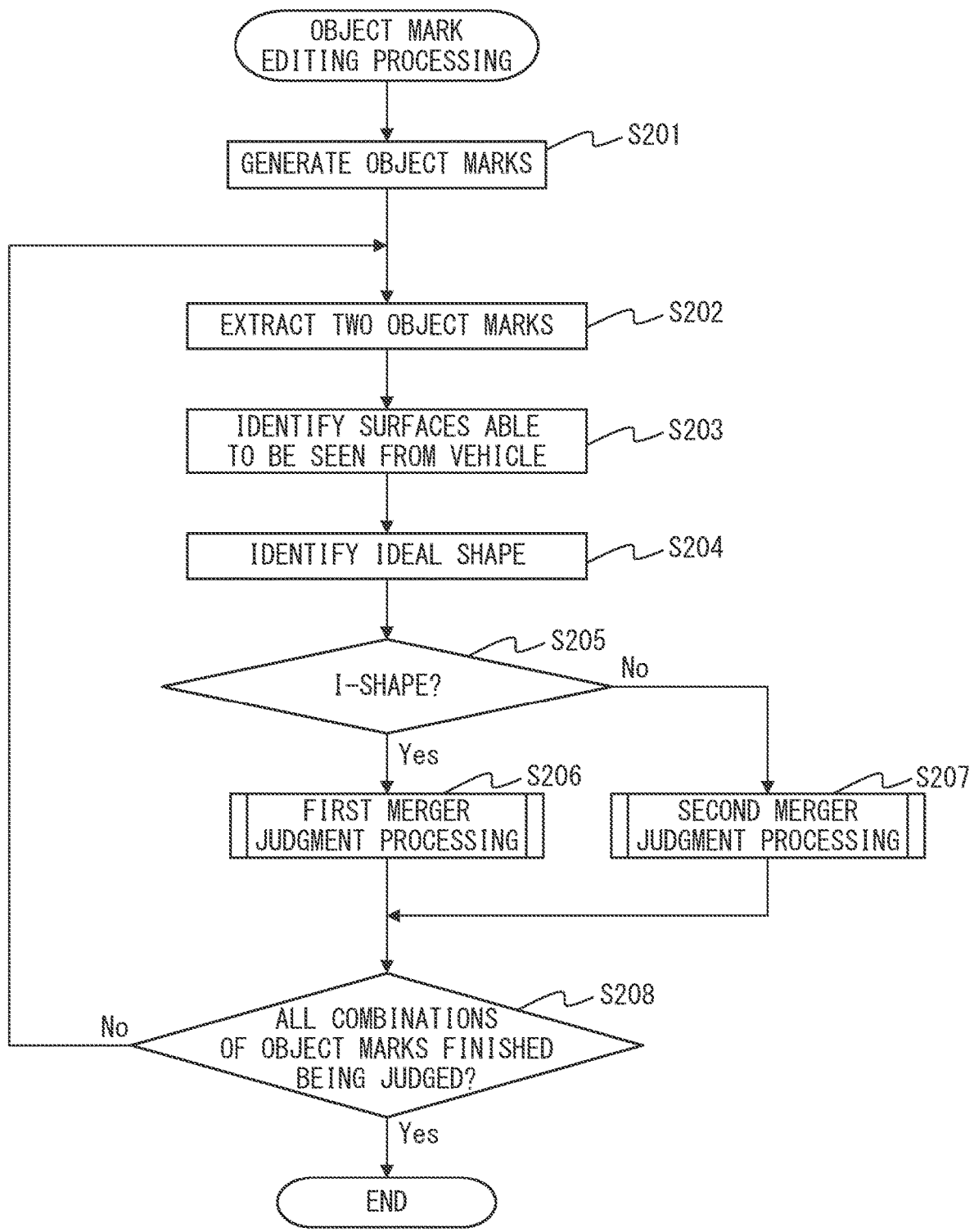
FIG. 11 is a flow chart showing a control routine of an object mark editing processing in a second embodiment of the present disclosure.

FIG. 11 is a flow chart showing the control routine of the object mark editing processing in a second embodiment of the present disclosure. The present control routine is repeatedly performed at predetermined execution intervals by the ECU 4. The predetermined execution interval, for example, is the interval at which the output of the surrounding vehicle detection device 2 is sent to the ECU 4.

Step S201 to step S204 are similar to step S101 to step S104 of FIG. 8, so explanations will be omitted.

After step S204, at step S205, it is judged whether the ideal shape identified at step S204 is an I-shape. If it is judged that the ideal shape is an I-shape, the present control routine proceeds to step S206. At step S206, the object mark editing part 45 performs the first merger judgment processing shown in FIG. 12 to judge whether two object marks may be merged. If the ideal shape is an I-shape, two object marks are generated for the same surface of a surrounding vehicle and whether merger is possible is judged by the following merger conditions.

Figure 12:
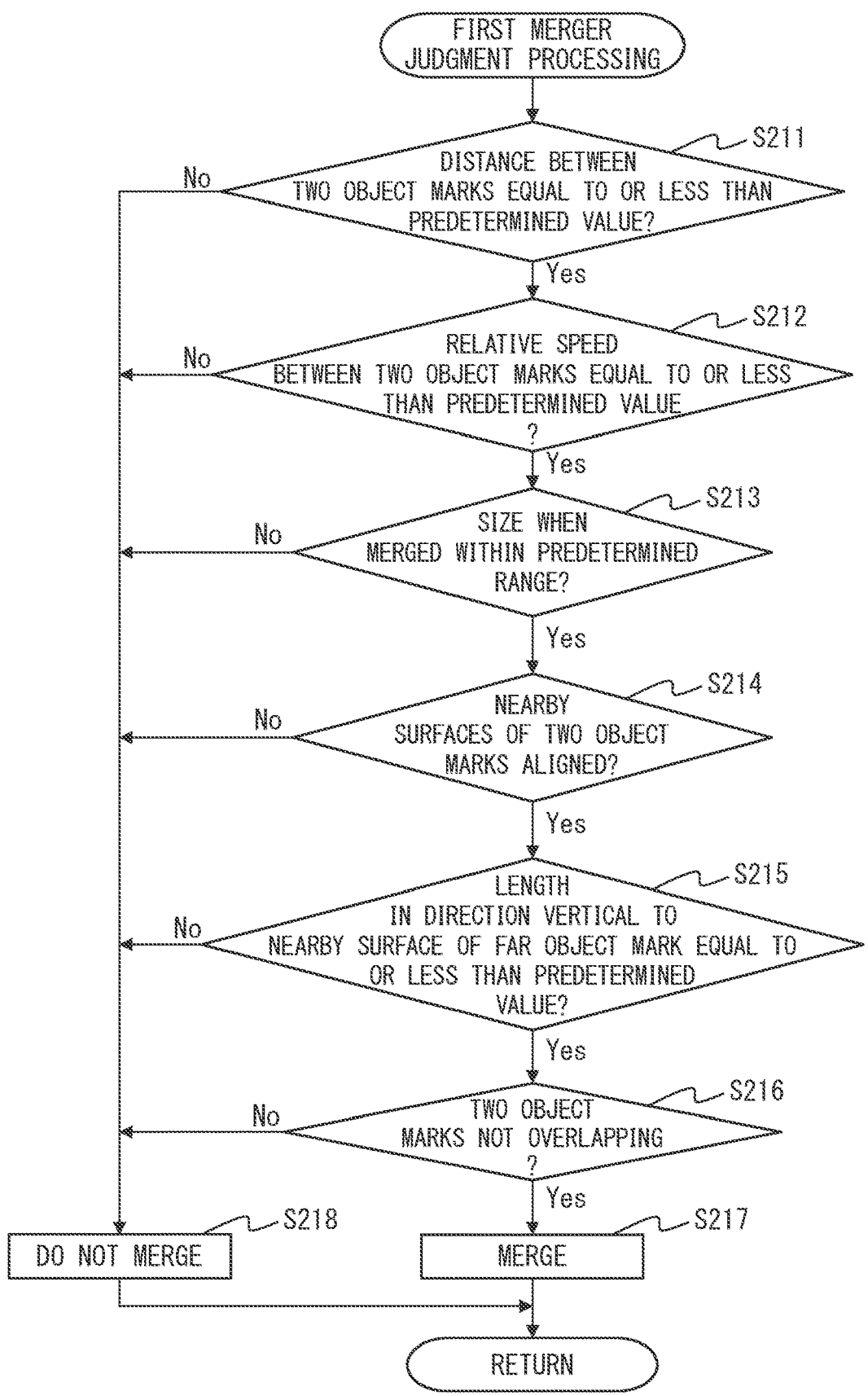
FIG. 12 is a flow chart showing a control routine of a first merger judgment processing in the second embodiment of the present disclosure.

Step S211 to step S213 of FIG. 12 are performed in the same way as step S111 to step S113 of FIG. 9. That is, the merger conditions include the distance between the two object marks being equal to or less than a predetermined value, the relative speed between the two object marks being equal to or less than a predetermined value, and the size when the two object marks are merged being within a predetermined range. If at step S213 it is judged that the size when the two object marks are merged is within the predetermined range, the present control routine proceeds to step S214.

Figure 13:
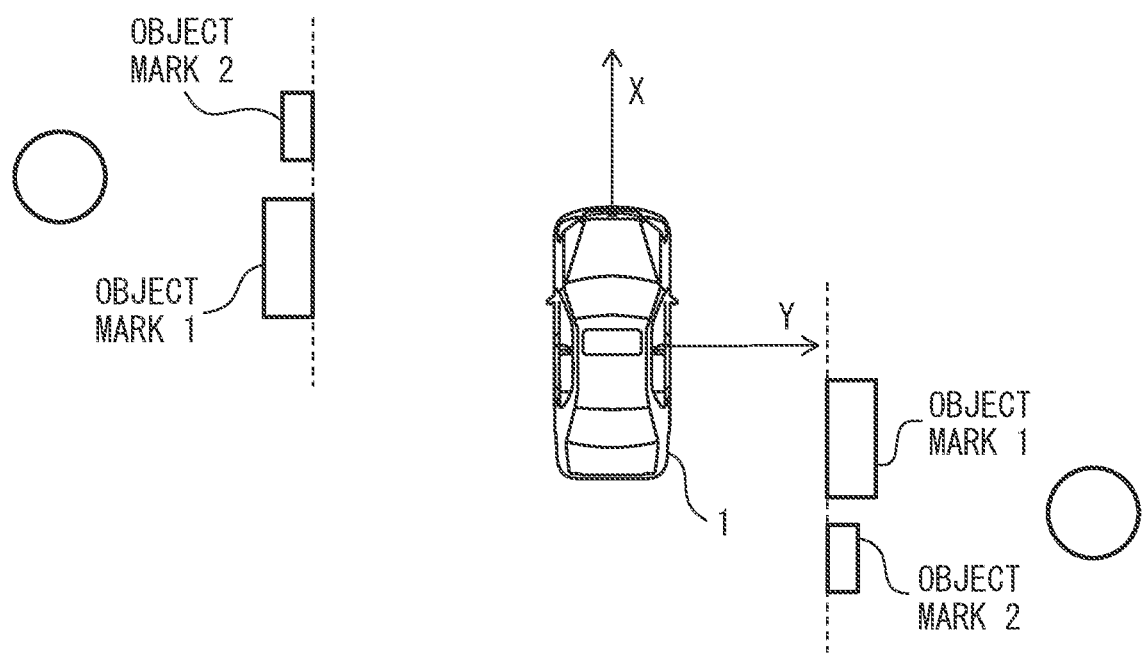
FIG. 13 is a view showing examples of two object marks in cases where merger conditions for an I-shape are satisfied.

At step S214, the object mark editing part 45 judges whether the nearby surfaces of the two object marks are aligned. That is, the merger conditions include that the nearby surfaces of the two object marks be aligned. In FIG. 13, examples of two object marks in cases where the merger conditions for an I-shape are satisfied are shown. As shown in FIG. 13, if the ideal shape is an I-shape, the object mark closer to the vehicle 1 is defined as the object mark 1, while the object mark farther from the vehicle 1 is defined as the object mark 2. That is, the nearest point of the object mark 1 (point with shortest distance to the vehicle 1 (for example, the center of the vehicle 1)) is closer to the vehicle 1 (for example, the center of the vehicle 1) than the nearest point of the object mark 2.

For example, the object mark editing part 45 judges that the nearby surfaces of two object marks are aligned when the difference in the positional coordinates of the nearby surface of one object mark and the positional coordinates of the nearby surface of the other object mark is equal to or less than a predetermined value. In this case, the positional coordinates of the nearby surface of an object mark are calculated as a point of a reference coordinate system having the center of the vehicle 1 as its origin. In the reference coordinate system, as shown in FIG. 13, the centerline of width of the vehicle 1 is made the X-axis, while the axis passing through the center of the vehicle 1 and perpendicular with the X-axis is made the Y-axis. Further, at the X-axis and Y-axis of the reference coordinate system, the side far from the vehicle 1 is set as positive, while the side close to the vehicle 1 is set as negative.

A "nearby surface" is the surface facing the vehicle 1 side. For this reason, when two object marks are positioned in front of the vehicle 1, the back surfaces correspond to the nearby surfaces, while when two object marks are positioned at the back of the vehicle 1, the front surfaces correspond to the nearby surfaces. In these cases, as shown in the following formula (5), when the difference between an x-coordinate $x_1$ of the nearby surface of the object mark 1 and an x-coordinate $x_2$ of the nearby surface of the object mark 2 is equal to or lower than a predetermined value $\alpha_1$, it is judged that the two object marks are aligned. The predetermined value $\alpha_1$ is determined in advance considering the detection error of the surrounding vehicle detection device 2.

$$|x_1 - x_2| \leq a_1 \quad (5)$$

When two object marks are positioned at the right side of the vehicle 1, the left side surfaces correspond to the nearby surfaces, while when two object marks are positioned at the left side of the vehicle 1, the right side surfaces correspond to the nearby surfaces. In these cases, as shown in the following formula (6), when the difference between a y-coordinate $y_1$ of the nearby surface of the object mark 1 and a y-coordinate $y_2$ of the nearby surface of the object mark 2 is equal to or less than a predetermined value $\alpha_2$, it is judged that the two object marks are aligned. The predetermined value $\alpha_2$ is determined considering the detection error of the surrounding vehicle detection device 2 and may be the same as or may be different from the predetermined value $\alpha_1$.

$$|y_1 - y_2| \leq a_2 \quad (6)$$

If at step S214 it is judged that the nearby surfaces of the two object marks are aligned, the present control routine proceeds to step S215. If two object marks merged into a traverse direction I-shape express the same surface of a single surrounding vehicle, as shown by the top side and bottom side of FIG. 13, the lengths of the object marks (lengths in the front-back direction) become shorter the further from the vehicle 1. On the other hand, if two object marks merged into a longitudinal direction I-shape express the same surface of a single surrounding vehicle, as shown by the right side and left side of FIG. 13, the widths of the object marks (lengths in the vehicle width direction) become shorter the further from the vehicle 1.

For this reason, at step S215, the object mark editing part 45 judges whether the length in the direction vertical to the nearby surface of the object mark far from the vehicle 1 among the two object marks is equal to or less than a predetermined value. That is, the merger conditions include that the length in the direction vertical to the nearby surface of the object mark far from the vehicle 1 among the two object marks be equal to or less than a predetermined value.

Figure 14:
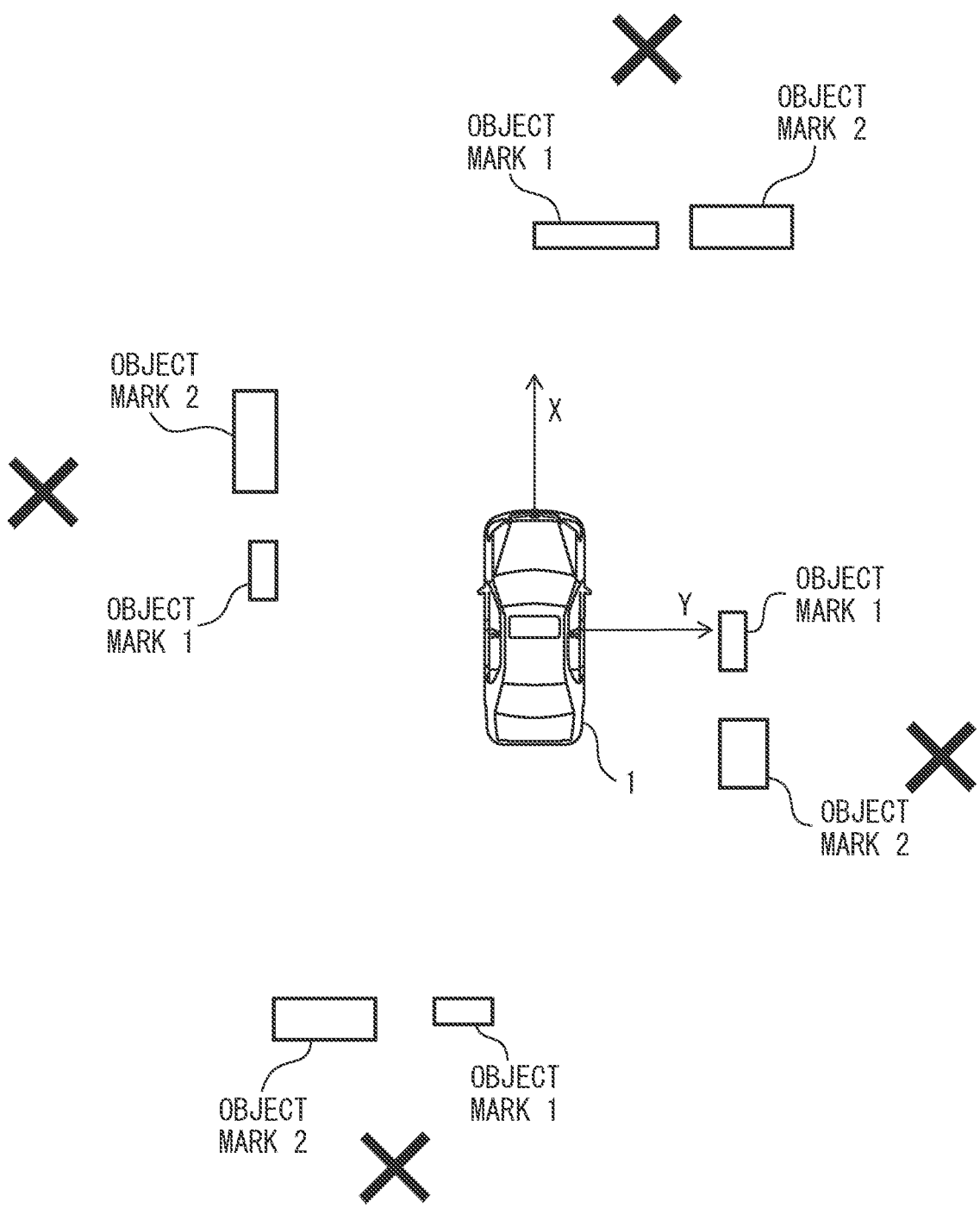
FIG. 14 is a view showing examples of two object marks in cases where merger conditions for an I-shape are not satisfied.

Specifically, if the ideal shape is a longitudinal direction I-shape, it is judged whether the following formula (7) is satisfied, while if the ideal shape is a traverse direction I-shape, it is judged whether the following formula (8) is satisfied. In FIG. 14, examples of two object marks in cases where these judgments are negative are shown.

$$W_2 \leq a_3 \quad (7)$$

$$L_2 \leq a_4 \quad (8)$$

Here, $W_2$ is the width of the object mark 2 and, for example, is calculated as the difference of the y-coordinate of the right side surface of the object mark 2 and the y-coordinate of the left side surface of the object mark 2. $L_2$ is the length of the object mark 2 and, for example, is calculated as the difference of the x-coordinate of the front surface of the object mark 2 and the x-coordinate of the back surface of the object mark 2. The predetermined values $a_3$ and $a_4$ are determined considering the detection error of the surrounding vehicle detection device 2. The predetermined value $a_4$ may be the same as or may be different from the predetermined value $a_3$.

Note that, at step S215, the object mark editing part 45 may judge whether the length in the direction vertical to the nearby surface of the object mark far from the vehicle 1 among the two object marks is equal to or less than the length in the direction vertical to the nearby surface of the object mark near to the vehicle 1 among the two object marks. That is, the merger conditions may include the length in the direction vertical to the nearby surface of the object mark far from the vehicle 1 among the two object marks being equal to or less than the length in the direction vertical to the nearby surface of the object mark near to the vehicle 1 among the two object marks.

If at step S215 it is judged that length in the direction vertical to the nearby surface of the object mark far from the vehicle 1 is equal to or less than a predetermined value, the present control routine proceeds to step S216. At step S216, the object mark editing part 45 judges whether the two object marks do not overlap. That is, the merger conditions include the two object marks not overlapping.

Figure 15:
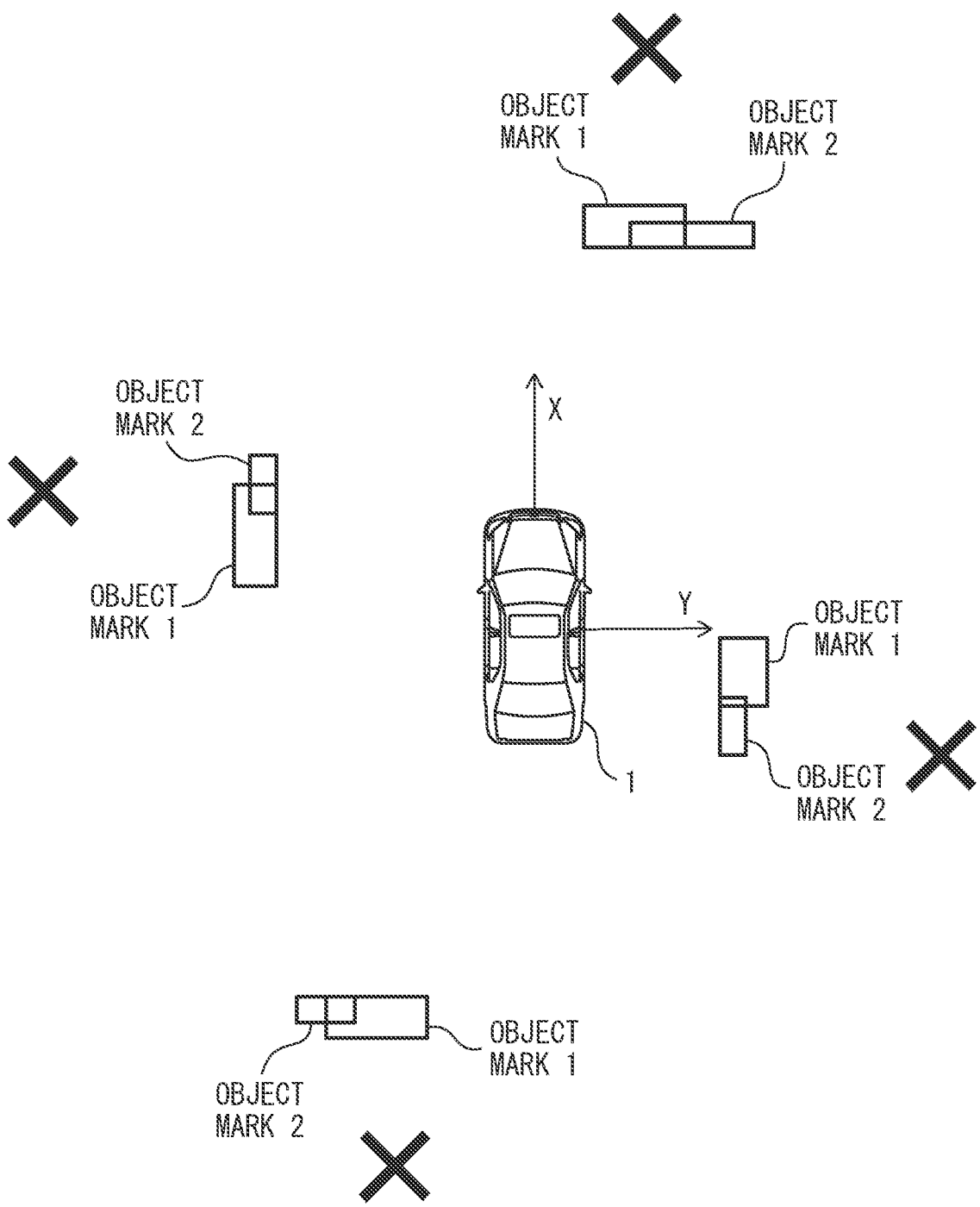
FIG. 15 is a view showing examples of two object marks in cases where merger conditions for an I-shape are not satisfied.

When the ideal shape is a traverse direction I-shape and the two object marks are positioned at the right side from the vehicle 1, as shown in the following formula (9), the object mark editing part 45 judges that the two object marks do not overlap when the value of the y-coordinate $y_{2L}$ of the left side surface of the object mark 2 minus the y-coordinate $y_{1R}$ of the right side surface of the object mark 1 is larger than zero. At the upper side of FIG. 15, the example of two object marks in the case where this judgment is negative, that is, in the case where the two object marks overlap, is shown.

$$y_{2L} - y_{1R} > 0 \quad (9)$$

When the ideal shape is a traverse direction I-shape and the two object marks are positioned at the left side from the vehicle 1, as shown in the following formula (10), the object mark editing part 45 judges that the two object marks do not overlap when the value of the y-coordinate $y_{2R}$ of the right side surface of the object mark 2 minus the y-coordinate $y_{1L}$ of the left side surface of the object mark 1 is larger than zero. At the lower side of FIG. 15, the example of two object marks in the case where this judgment is negative, that is, in the case where the two object marks overlap, is shown.

$$y_{2R} - y_{1L} > 0 \tag{10}$$

When the ideal shape is a longitudinal direction I-shape and the two object marks are positioned at the front from the vehicle 1, as shown in the following formula (11), the object mark editing part 45 judges that the two object marks do not overlap when the value of the x-coordinate $x_{2T}$ of the back surface of the object mark 2 minus the x-coordinate $x_{1F}$ of the front surface of the object mark 1 is larger than zero. At the left side of FIG. 15, the example of two object marks in the case where this judgment is negative, that is, in the case where the two object marks overlap, is shown.

$$x_{2T} - x_{1F} > 0 \tag{11}$$

When the ideal shape is a longitudinal direction I-shape and the two object marks are positioned at the back from the vehicle 1, as shown in the following formula (12), the object mark editing part 45 judges that the two object marks do not overlap when the value of the x-coordinate $x_{2F}$ of the front surface of the object mark 2 minus the x-coordinate $x_{1T}$ of the back surface of the object mark 1 is larger than zero. At the right side of FIG. 15, the example of two object marks in the case where this judgment is negative, that is, in the case where the two object marks overlap, is shown.

$$x_{2F} - x_{1T} > 0 \tag{12}$$

Note that, the right sides of the above formula (9) to formula (12) may be negative values determined considering the detection error of the surrounding vehicle detection device 2. That is, when the amount of overlap of the two object mark is equal to or less than a predetermined value, the object mark editing part 45 may judge that the two object marks do not overlap, If at step S216 it is judged that the two object marks do not overlap, the present control routine proceeds to step S217. At step S217, since all of the merger conditions are satisfied, the object mark editing part 45 merges the two object marks to the ideal shape. That is, the two object marks are recognized as a single surrounding vehicle. On the other hand, if the judgment of any one of steps S211 to S216 is negative, the present control routine proceeds to step S218. At step S218, the object mark editing part 45 does not merge the two object marks. That is, the two object marks are recognized as two surrounding vehicles. After step S217 or step S218, the present control routine proceeds to step S208 of FIG. 11.

On the other hand, if at step S205 it is judged that the ideal shape is an L-shape, the present control routine proceeds to step S207. At step S207, the object mark editing part 45 performs the second merger judgment processing shown in FIG. 16 so as to judge whether to merge the two object marks. If the ideal shape is an L-shape, two object marks are generated for two different surfaces of the surrounding vehicle and whether to merge the objects is judged by the following merger conditions.

Figure 16:
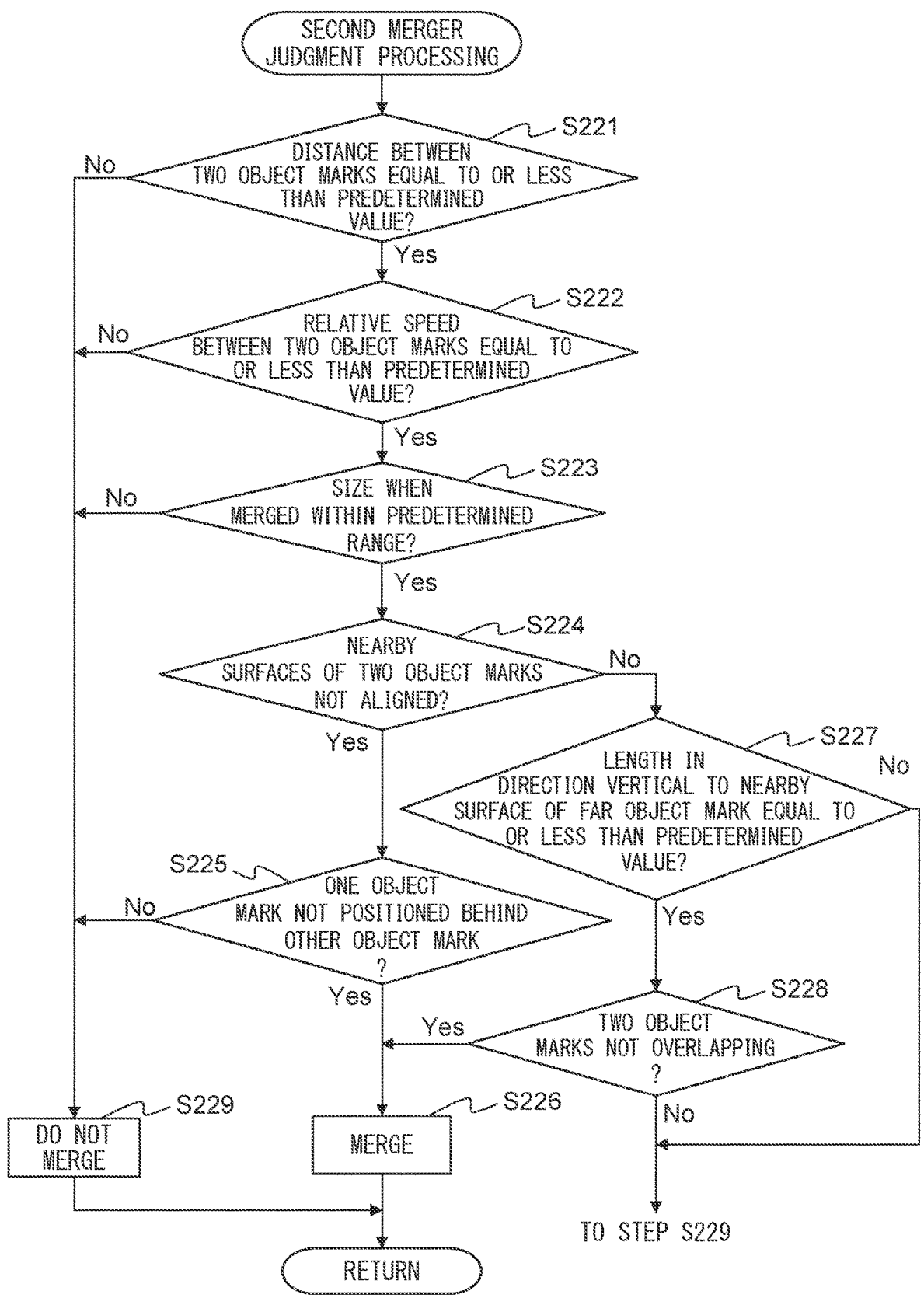
FIG. 16 is a flow chart showing a control routine of a second merger judgment processing in the second embodiment of the present disclosure.

Step S221 to step S223 of FIG. 16 are performed in the same way as step S111 to step S113 of FIG. 9. That is, the merger conditions include the distance between the two object marks being equal to or less than a predetermined value, the relative speed between the two object marks being equal to or less than a predetermined value, and the size when the two object marks are merged being within a predetermined range. If at step S223 it is judged that the size when the two object marks are merged is within a predetermined range, the present control routine proceeds to step S224.

At step S224, the object mark editing part 45 judges whether the nearby surfaces of the two object marks are not aligned. That is, the merger conditions include the nearby surfaces of the two object marks not being aligned. In FIG. 17, examples of two object marks in the cases where the merger conditions for the L-shape are satisfied are shown. As shown in FIG. 17, if the ideal shape is an L-shape, the object mark with the shorter distance from the nearby surface in the front-back direction (front surface or back surface) to the vehicle 1, for example, the distance from the nearby surface in the front-back direction to the Y-axis, is defined as the object mark 1, while the object mark with the longer distance is defined as the object mark 2. Note that, if the distances of the two object marks are substantially equal (see FIG. 20), the object mark closer to the vehicle 1 is defined as the object mark 1 while the object mark further from the vehicle 1 is defined as the object mark 2.

If the nearby surface is the back surface or the front surface, as shown in the following formula (13), it is judged that the nearby surfaces of the two object marks are not aligned when the x-coordinate $x_2$ of the nearby surface of the object mark 2 is larger than the x-coordinate $x_1$ of the nearby surface of the object mark 1.

$$x_2 > x_1 \tag{13}$$

If the nearby surface is the right side surface or the left side surface, as shown in the following formula (14), it is judged that the nearby surfaces of the two object marks are not aligned when the y-coordinate $y_1$ of the nearby surface of the object mark 1 is larger than the y-coordinate $y_2$ of the nearby surface of the object mark 2.

$$y_1 > y_2 \tag{14}$$

If as shown at the top right of FIG. 17, the nearby surfaces of the two object marks are the back surface and the left side surface, it is judged that the nearby surfaces of the two object marks are not aligned when the above formula (13) is satisfied for the back surface and the above formula (14) is satisfied for the left side surface. If as shown at the top left of FIG. 17, the nearby surfaces of the two object marks are the back surface and the right side surface, it is judged that the nearby surfaces of the two object marks are not aligned when the above formula (13) is satisfied for the back surface and the above formula (14) is satisfied for the right side surface.

If as shown at the bottom right of FIG. 17, the nearby surfaces of the two object marks are the front surface and left side surface, it is judged that the nearby surfaces of the two object marks are not aligned when the above formula (13) is satisfied for the front surface and the above formula (14) is satisfied for the left side surface. If as shown at the bottom left of FIG. 17, the nearby surfaces of the two object marks are the front surface and the right side surface, it is judged that the nearby surfaces of the two object marks are not aligned when the above formula (13) is satisfied for the front surface and the above formula (14) is satisfied for the right side surface.

Note that, if the nearby surfaces are the back surfaces or the front surfaces, it may be judged that the nearby surfaces of the two object marks are not aligned when the above formula (5) is not satisfied, that is, when the difference of the x-coordinate $x_1$ of the nearby surface of the object mark 1 and the x-coordinate $x_2$ of the nearby surface of the object mark 2 is larger than the predetermined value $a_1$. Further, if a nearby surface is the right side surface or the left side surface, it may be judged that the nearby surfaces of the two object marks are not aligned when the above formula (6) is not satisfied, that is, when the difference of the y-coordinate $y_1$ of the nearby surface of the object mark 1 and the y-coordinate $y_2$ of the nearby surface of the object mark 2 is larger than the predetermined value $a_2$.

If at step S224 it is judged that the nearby surfaces of the two object marks are not aligned, the present control routine proceeds to step S225. At step S225, the object mark editing part 45 judges whether when the two object marks are viewed from the vehicle 1, one object mark among the two object marks is not positioned behind the other object mark among the two object marks. That is, the merger conditions include that one object mark among the two object marks not be positioned behind the other object mark among the two object marks when viewed from the vehicle 1.

In FIG. 18, examples where the object mark 1 is positioned behind the object mark 2 when viewed from the vehicle 1, that is, examples where the merger conditions for an L-shape are not satisfied, are shown. If the two object marks are positioned in front of the vehicle 1, the object mark editing part 45 judges that the object mark 1 is not positioned behind the object mark 2 when viewed from the vehicle 1 when, as shown in the above formula (11), the value of the x-coordinate $x_{2T}$ of the back surface of the object mark 2 minus the x-coordinate $x_{1F}$ of the front surface of the object mark 1 is larger than zero. If the two object marks are positioned in back of the vehicle 1, the object mark editing part 45 judges that the object mark 1 is not positioned behind the object mark 2 when viewed from the vehicle 1 when, as shown in the above formula (12), the value of the x-coordinate $x_{2F}$ of the front surface of the object mark 2 minus the x-coordinate $x_{1T}$ of the back surface of the object mark 1 is larger than zero.

Note that, the right sides of the above formula (11) and formula (12) may be negative values determined considering the detection error of the surrounding vehicle detection device 2. That is, when the front-back direction overlap of the object mark 1 and the object mark 2 is equal to or less than a predetermined value, the object mark editing part 45 may judge that the object mark 1 is not positioned behind the object mark 2 when viewed from the vehicle 1.

In FIG. 19, examples where the object mark 2 is positioned behind the object mark 1 when viewed from the vehicle 1, that is, examples where the merger conditions for an L-shape are not satisfied, are shown. If the two object marks are positioned at the right side of the vehicle 1, the object mark editing part 45 judges that the object mark 2 is not positioned behind the object mark 1 when viewed from the vehicle 1 when, as shown in the following formula (15), the value of the y-coordinate $y_{1L}$ of the left side surface of the object mark 1 minus the y-coordinate $y_{2R}$ of the right side surface of the object mark 2 is larger than zero. If the two object marks are positioned at the left side of the vehicle 1, the object mark editing part 45 judges that the object mark 2 is not positioned behind the object mark 1 when viewed from the vehicle 1 when, as shown in the following formula (16), the value of the y-coordinate $y_{1R}$ of the right side surface of the object mark 1 minus the y-coordinate $y_{2L}$ of the left side surface of the object mark 2 is larger than zero.

$$y_{1L} - y_{2R} > 0 \quad (15)$$

$$y_{1R} - y_{2L} > 0 \quad (16)$$

Note that, the right sides of the above formula (15) and formula (16) may be negative values determined considering the detection error of the surrounding vehicle detection device 2. That is, when the vehicle width direction overlap of the object mark 1 and the object mark 2 is equal to or less than a predetermined value, the object mark editing part 45 may judge that the object mark 2 is not positioned behind the object mark 1 when viewed from the vehicle 1.

If at step S225 it is judged that one object mark is not positioned behind the other the object mark, the present control routine proceeds to step S226. At step S226, since all merger conditions are satisfied, the object mark editing part 45 merges the two object marks to the ideal shape. That is, the two object marks are recognized as a single surrounding vehicle.

On the other hand, if at step S224 it is judged that the nearby surfaces of the two object marks are aligned, the present control routine proceeds to step S227. In this case, the merger conditions include that the nearby surfaces of the two object marks be aligned.

In FIG. 20, examples of two object marks in the case where the judgment of step S224 is negative are shown. In the example at the top right of FIG. 20, the back surfaces of the two object marks are aligned, while in the example at the bottom left of FIG. 20, the front surfaces of the two object marks are aligned. Further, in the example at the top left of FIG. 20, the right side surfaces of the two object marks are aligned, while in the example at the bottom right of FIG. 20, the left side surfaces of the two object marks are aligned. That is, in these examples, the corner of a surrounding vehicle is detected by the surrounding vehicle detection device 2.

At step S227, in the same way as step S215 of FIG. 12, the object mark editing part 45 judges whether the length in the direction vertical to the nearby surface of the object mark far from the vehicle 1 among the two object marks is equal to or less than a predetermined value. That is, the merger conditions include that the length in the direction vertical to the nearby surface of the object mark far from the vehicle 1 among the two object marks be equal to or less than a predetermined value.

Specifically, if the aligned nearby surfaces of the two object marks are the right side surfaces or the left side surfaces (example at top left or bottom right of FIG. 20), it is judged whether the above formula (7) is satisfied. If aligned nearby surfaces of the two object marks are the front surfaces or the back surfaces (example at top right or bottom left of FIG. 20), it is judged whether the above formula (8) is satisfied. In FIG. 20, examples of the two object marks in the case where these judgments are satisfied are shown.

Note that, at step S227, the object mark editing part 45 may judge whether the length in the direction vertical to the nearby surface of the object mark far from the vehicle 1 among the two object marks is equal to or less than the length in the direction vertical to the nearby surface of the object mark close to the vehicle 1 among the two object marks. That is, the merger conditions may include that the length in the direction vertical to the nearby surface of the object mark far from the vehicle 1 among the two object marks be equal to or less than the length in the direction vertical to the nearby surface of the object mark close to the vehicle 1 among the two object marks.

If at step S227 it is judged that the length in the direction vertical to the nearby surface of the object mark far from the vehicle 1 is equal to or less than a predetermined value, the present control routine proceeds to step S228. At step S228, in the same way as step S216 of FIG. 12, the object mark editing part 45 judges whether the two object marks do not overlap. That is, merger conditions include that the two object marks do not overlap.

If the aligned nearby surfaces of the two object marks are the front surfaces or the back surfaces and the two object marks are positioned at the right side from the vehicle 1, the object mark editing part 45 judges that the two object marks do not overlap when as shown in the above formula (9), the value of the y-coordinate $y_{2L}$ of the left side surface of the object mark 2 minus the y-coordinate $y_{1R}$ of the right side surface of the object mark 1 is larger than zero. At the top right of FIG. 20, the example of two object marks in the case where this judgment is affirmative, that is, the case where the two object marks do not overlap, is shown.

If the aligned nearby surfaces of the two object marks are the front surfaces or the back surfaces and the two object marks are positioned at the left side from the vehicle 1, the object mark editing part 45 judges that the two object marks do not overlap when as shown in the above formula (10), the value of the y-coordinate $y_{2R}$ of the right side surface of the object mark 2 minus the y-coordinate $y_{1L}$ of the left side surface of the object mark 1 is larger than zero. At the bottom left of FIG. 20, the example of two object marks in the case where this judgment is affirmative, that is, the case where the two object marks do not overlap, is shown.

If the aligned nearby surfaces of the two object marks are the right side surfaces or the left side surfaces and the two object marks are positioned at the front side from the vehicle 1, the object mark editing part 45 judges that the two object marks do not overlap when as shown in the above formula (11), the value of the x-coordinate $x_{2T}$ of the back surface of the object mark 2 minus the x-coordinate $x_{1F}$ of the front surface of the object mark 1 is larger than zero. At the top left of FIG. 20, the example of two object marks in the case where this judgment is affirmative, that is, the case where the two object marks do not overlap, is shown.

If the aligned nearby surfaces of the two object marks are the right side surfaces or the left side surfaces and the two object marks are positioned at the rear side from the vehicle 1, the object mark editing part 45 judges that the two object marks do not overlap when as shown in the above formula (12), the value of the x-coordinate $x_{2F}$ of the front surface of the object mark 2 minus the x-coordinate $x_{1T}$ of the back surface of the object mark 1 is larger than zero. At the bottom right of FIG. 20, the example of two object marks in the case where this judgment is affirmative, that is, the case where the two object marks do not overlap, is shown.

If at step S228 it is judged that the two object marks do not overlap, the present control routine proceeds to step S226. At step S226, the object mark editing part 45 merges the two object marks to the ideal shape. That is, if the ideal shape is an L-shape, the two object marks are merged to the ideal shape even when the merger conditions for the I-shape (steps S221 to S224, S227, and S228) of FIG. 16 are satisfied.

On the other hand, if the judgment at any one of steps S221 to S223, S225, S227, and S228 is negative, the present control routine proceeds to step S229. At step S229, the object mark editing part 45 does not merge the two object marks. That is, the two object marks are recognized as two surrounding vehicles. After step S226 or step S229, the present control routine proceeds to step S208 of FIG. 11.

At step S208, the object mark editing part 45 judges whether all of the combinations of the object marks generated by the object mark generating part 44 have finished being judged. If it is judged that they have not finished being judged, step S202 to step S207 are again performed. On the other hand, if it is judged that they have finished being judged, the present control routine ends.

Note that, in the same way as step 113 of FIG. 9, at step S213 of FIG. 12 and step S223 of FIG. 16, the object mark editing part 45 may judge whether the difference between the size when the two object marks are merged to the ideal shape and the size of the vehicle icon is equal to or less than a predetermined value. In this case, at step S213, if the ideal shape is a traverse direction I-shape, only the vehicle width direction length is judged as the size when the two object marks are merged to the ideal shape, while if the ideal shape is a longitudinal direction I-shape, only the front-back direction length is judged as the size when the two object marks are merged to the ideal shape.

Further, as the merger conditions for the I-shape, any one or any combination of step S211 to step S216 may be used. Similarly, as the merger conditions for the L-shape, any one or any combination of step S221 to step S225 or any one or any combination of step S221 to S224, S227, and S228 may be used. Further, step S227 and S228 may be omitted and, if the judgment of step S224 is negative, step S229 may be performed.

Third Embodiment

The vehicle according to the third embodiment is basically the same in configuration and control as the vehicle according to the first embodiment except for the points explained below. For this reason, below, the third embodiment of the present disclosure will be explained centered on parts different from the first embodiment.

In the first embodiment, the object marks to be displayed at the display device 3 and object marks to be used for control of autonomous running by the driving control part 46 are edited based on the same standard. That is, the surrounding vehicles around the vehicle 1 are recognized based on the same standard. However, in the display of surrounding vehicles at the display device 3, it is considered important to reduce any odd feeling of the display so as to improve usability, while with vehicle recognition for control of autonomous running, it is necessary to prevent mistaken recognition for improving safety.

For this reason, in the third embodiment, the object mark editing part 45 edits the object marks generated by the object mark generating part 44 based on a first standard so as to thereby create a first group of object marks to be displayed at the display device 3, and edits the object marks generated by the object mark generating part 44 based on a second standard so as to thereby create a second group of object marks to be used for control of autonomous running. With the first standard, as explained above, if the merger conditions are satisfied, the two object marks are merged to the ideal shape, while with the second standard, the two object marks are not merged to the ideal shape. That is, with the second standard, the two object marks are merged without using the concept of an ideal shape. Due to this, it is possible to secure safety of the vehicle 1 while reducing any odd feeling of the display.

The object mark editing part 45 performs a control routine of the object mark editing processing shown in FIG. 8 to thereby create the first group of object marks to be displayed at the display device 3. That is, the object marks edited by the control routine of the object mark editing processing shown in FIG. 8 are displayed as the first group of object marks on the display device 3. On the other hand, the object mark editing part 45 performs a control routine of the second object mark editing processing shown in FIG. 21 to thereby create the second group of object marks used for control of autonomous driving.

Figure 21:
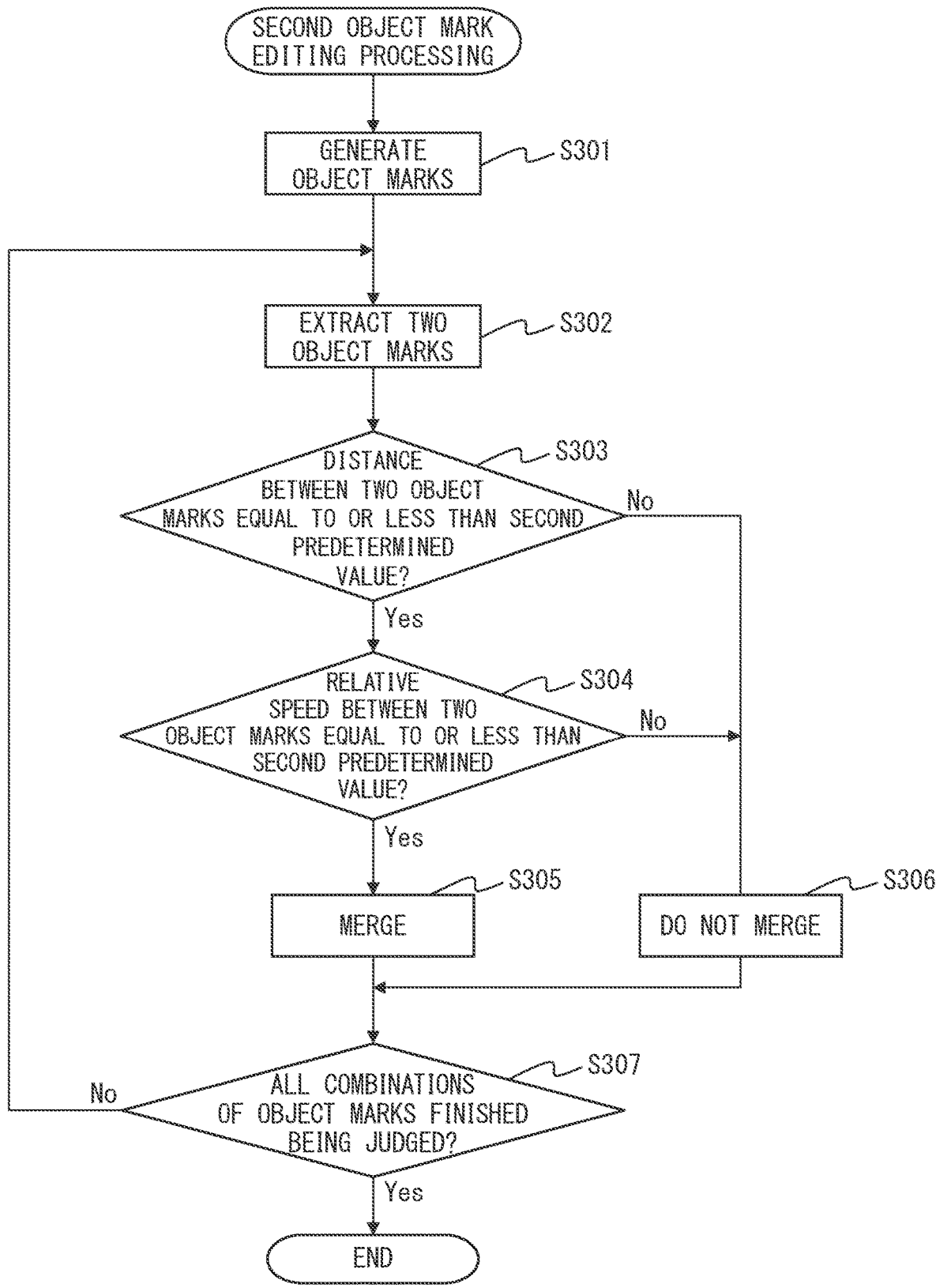
FIG. 21 is a flow chart showing a control routine of a second object mark editing processing in a third embodiment of the present disclosure.

FIG. 21 is a flow chart showing the control routine of the second object mark editing processing in the third embodiment of the present disclosure. The present control routine is repeatedly performed at predetermined execution intervals by the ECU 4. The predetermined execution intervals are, for example, intervals at which the output of the surrounding vehicle detection device 2 is sent to the ECU 4.

First, at step S301, the object mark generating part 44 generates object marks by grouping reflected points of surrounding vehicles detected by the surrounding vehicle detection device 2.

Next, at step S302, the object mark editing part 45 extracts two object marks from the object marks generated by the object mark generating part 44.

Next, at step S303, the object mark editing part 45 judges whether the distance between the two object marks is equal to or less than a second predetermined value. The second predetermined value is set to a value smaller than the predetermined value at step S111 of FIG. 9. That is, when it is judged whether to merge two object marks based on the distance between the two object marks, a condition more severe than the first standard is applied by the second standard. If at step S303 it is judged that the distance between the two object marks is equal to or less than the second predetermined value, the present control routine proceeds to step S304.

At step S304, the object mark editing part 45 judges whether the relative speed between the two object marks is equal to or less than a second predetermined value. The second predetermined value is set to a value smaller than the predetermined value at step S112 of FIG. 9. That is, when whether to merge the two object marks is judged based on the relative speed between the two object marks, a condition more severe than the first standard is applied by the second standard. If at step S304 it is judged that the relative speed between the two object marks is equal to or less than the second predetermined value, the present control routine proceeds to step S305.

At step S305, the object mark editing part 45 merges the two object marks. That is, the two object marks are recognized as a single surrounding vehicle. For example, the object mark editing part 45 merges the two object marks into a rectangular shape surrounding the two object marks. On the other hand, if the judgment at step S303 or S304 is negative, the present control routine proceeds to step S306. At step S306, the object mark editing part 45 does not merge the two object marks. That is, the two object marks are recognized as two surrounding vehicles. After step S305 or step S306, the present control routine proceeds to step S307.

At step S307, the object mark editing part 45 judges whether all of the combinations of object marks generated by the object mark generating part 44 have finished being judged. If it is judged that they have not finished being judged, step S302 to step S306 are again performed. On the other hand, if it is judged that they have finished being judged, the present control routine ends.

Above, preferred embodiments according to the present disclosure were explained, but the present disclosure is not limited to these embodiments and can be corrected and changed in various ways within the language of the claims. For example, the ECU 4 may have a GPU (graphics processing unit).

Further, the above embodiments can be worked combined in any way. For example, if the second embodiment and the third embodiment are combined, the object mark editing part 45 creates a first group of object marks to be displayed at the display device 3 by performing the control routine of the object mark editing processing shown in FIG. 11.

REFERENCE SIGNS LIST 1 vehicle
2 surrounding vehicle detection device
3 display device
4 electronic control unit (ECU)
43 processor
44 object mark generating part
45 object mark editing part

The invention claimed is:

1. A vehicle comprising:
   a surrounding vehicle detector detecting reflected points of surrounding vehicles present around the vehicle by emitting electromagnetic waves to surroundings of the vehicle; and
   a processor configured to generate object marks by grouping the reflected points detected by the surrounding vehicle detector, and edit the generated object marks, wherein
   the processor is configured to extract two object marks from the generated object marks, identify an ideal shape for when the two object marks are merged based on surfaces defined by the two object marks and able to be seen from the vehicle, and merge the two object marks into the ideal shape if predetermined merger conditions are satisfied.

2. The vehicle according to claim 1, wherein the merger conditions differ according to a type of the ideal shape identified by the processor.

3. The vehicle according to claim 1, wherein if the ideal shape identified by the processor is an I-shape, the merger conditions include the nearby surfaces of the two object marks being aligned.

4. The vehicle according to claim 1, wherein if the ideal shape identified by the processor is an I-shape, the merger conditions include a length in a direction vertical to a nearby surface of an object mark far from the vehicle among the two object marks being equal to or less than a predetermined value.

5. The vehicle according to claim 1, wherein if the ideal shape identified by the processor is an I-shape, the merger conditions include the two object marks not overlapping.

6. The vehicle according to claim 1, wherein if the ideal shape identified by the processor is an L-shape, the merger conditions include nearby surfaces of the two object marks not being aligned.

7. The vehicle according to claim 1, wherein if the ideal shape identified by the processor is an L-shape, the merger conditions include one object mark among the two object marks not being positioned behind the other object mark among the two object marks when seen from the vehicle.

8. The vehicle according to claim 1, further comprising a display displaying object marks edited by the processor as vehicle icons.

9. The vehicle according to claim 8, wherein the merger conditions include a difference between a size when the two object marks are merged to the ideal shape and a size of the vehicle icon being equal to or less than a predetermined value.

10. The vehicle according to claim 8, wherein
    the processor is further configured to control autonomous running of the vehicle,
    the processor is configured to create a first group of object marks to be displayed on the display by editing the generated object marks based on a first standard, and create a second group of object marks used for control of the autonomous running by editing the generated object marks based on a second standard, and
    in the first standard, the two object marks are merged into the ideal shape if the merger conditions are satisfied, and in the second standard, the two object marks are not merged into the ideal shape.

11. A method of recognition of a surrounding vehicle comprising:
  detecting reflected points of surrounding vehicles present around the vehicle by emitting electromagnetic waves to surroundings of the vehicle;
  generating object marks by grouping the reflected points;
  extracting two object marks from the object marks; and
  identifying an ideal shape when the two object marks are merged based on surfaces defined by the two object marks and able to be seen from the vehicle and merging the two object marks into the ideal shape if predetermined merger conditions are satisfied.

* * * * *